United States Patent
Lim

(10) Patent No.: US 12,052,618 B2
(45) Date of Patent: Jul. 30, 2024

(54) ELECTRONIC DEVICE FOR SELECTING CELL AND METHOD FOR OPERATING THEREOF

(71) Applicant: Samsung Electronics Co., Ltd., Suwon-si (KR)

(72) Inventor: Yongtae Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 17/559,678

(22) Filed: Dec. 22, 2021

(65) Prior Publication Data
US 2022/0210707 A1 Jun. 30, 2022

Related U.S. Application Data

(63) Continuation of application No. PCT/KR2021/018674, filed on Dec. 9, 2021.

(30) Foreign Application Priority Data

Dec. 24, 2020 (KR) ........................ 10-2020-0183732

(51) Int. Cl.
*H04W 36/00* (2009.01)
*H04W 36/14* (2009.01)

(52) U.S. Cl.
CPC ....... *H04W 36/0085* (2018.08); *H04W 36/14* (2013.01)

(58) Field of Classification Search
CPC . H04W 36/0085; H04W 36/14; H04W 36/24; H04W 36/30; H04W 24/08;
(Continued)

(56) References Cited

U.S. PATENT DOCUMENTS

2006/0183502 A1 8/2006 Jeong et al.
2010/0130205 A1 5/2010 Jung et al.
(Continued)

FOREIGN PATENT DOCUMENTS

EP 3678427 A1 7/2020
JP 2006-174447 A 6/2006
(Continued)

OTHER PUBLICATIONS

International Search Report dated Mar. 15, 2022, issued in International Application No. PCT/KR2021/018674.
(Continued)

*Primary Examiner* — Mohamed A Kamara
(74) *Attorney, Agent, or Firm* — Jefferson IP Law, LLP

(57) ABSTRACT

An electronic device is provided. The electronic device includes at least one processor, and the at least one processor may be configured to camp on a first cell, perform a procedure for registration in a first core network after camping on the first cell, identify occurrence of an event requiring cell selection in a state registered with the first core network, identify a core network corresponding to the occurred event, identify a core network supported by each of at least one second cell, identify a measurement result of the reference signal respectively associated with at least one third cell supporting the core network corresponding to the occurred event among the at least one second cell, and camp on the identified fourth cell among the at least one third cell, based on the measurement result.

20 Claims, 16 Drawing Sheets

(58) Field of Classification Search
CPC ..... H04W 48/16; H04W 48/20; H04W 76/18; H04W 76/19; H04W 76/30; H04W 88/02; H04W 48/18; H04W 48/12; H04B 17/309
See application file for complete search history.

(56) References Cited

U.S. PATENT DOCUMENTS

| | | | |
|---|---|---|---|
| 2013/0265954 | A1 | 10/2013 | Dahlen et al. |
| 2014/0235242 | A1 | 8/2014 | Granzow et al. |
| 2015/0237672 | A1 | 8/2015 | Kanamarlapudi et al. |
| 2017/0188276 | A1 | 6/2017 | Melin et al. |
| 2018/0234990 | A1 | 8/2018 | Watfa et al. |
| 2019/0082431 | A1 | 3/2019 | Yi et al. |
| 2019/0150216 | A1* | 5/2019 | Chen ............... H04W 76/19 370/331 |
| 2019/0261264 | A1 | 8/2019 | Lou et al. |
| 2019/0342827 | A1 | 11/2019 | Kim et al. |
| 2019/0357125 | A1 | 11/2019 | Mildh et al. |
| 2020/0084674 | A1 | 3/2020 | Kubota et al. |
| 2020/0120470 | A1* | 4/2020 | Arshad ............. H04W 8/065 |
| 2020/0187073 | A1 | 6/2020 | Ma et al. |
| 2020/0275361 | A1 | 8/2020 | Ohlsson et al. |
| 2020/0344653 | A1 | 10/2020 | Kadiri et al. |
| 2020/0367150 | A1 | 11/2020 | Chun et al. |
| 2021/0022198 | A1 | 1/2021 | Wang et al. |
| 2021/0127326 | A1* | 4/2021 | Ohlsson ........... H04W 48/18 |
| 2021/0235415 | A1 | 7/2021 | Sha et al. |
| 2021/0266802 | A1* | 8/2021 | Arshad ......... H04W 36/00835 |
| 2021/0377848 | A1* | 12/2021 | Wu .................. H04W 76/20 |

FOREIGN PATENT DOCUMENTS

| | | |
|---|---|---|
| KR | 10-2014-0005320 A | 1/2014 |
| KR | 10-2017-0070191 A | 6/2017 |
| KR | 10-2019-0007519 A | 1/2019 |
| KR | 10-2019-0113884 A | 10/2019 |
| KR | 10-2020-0039003 A | 4/2020 |
| KR | 10-2020-0120946 A | 10/2020 |
| KR | 10-2020-0135500 A | 12/2020 |
| WO | 2019/192608 A1 | 10/2019 |
| WO | 2020/033810 A1 | 2/2020 |
| WO | 2020/067758 A1 | 4/2020 |
| WO | 2020/069760 A1 | 4/2020 |
| WO | 2020/081555 A1 | 4/2020 |

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 16), 3GPP TS 36.331 V16.5.0, Jul. 6, 2021.

3rd Generation Partnership Project; Technical Specification Group Radio Access Network; NR; Radio Resource Control (RRC) protocol specification (Release 16), 3GPP TS 38.331 V16.5.0, Jul. 6, 2021.

Extended European Search Report dated Mar. 6, 2024, issued in European Patent Application No. 21911338.8.

* cited by examiner

ELECTRONIC DEVICE FOR SELECTING CELL AND METHOD FOR OPERATING THEREOF

CROSS-REFERENCE TO RELATED APPLICATION(S)

This application is a continuation application, claiming priority under § 365(c), of an International application No. PCT/KR2021/018674, filed on Dec. 9, 2021, which is based on and claims the benefit of a Korean patent application number 10-2020-0183732, filed on Dec. 24, 2020, in the Korean Intellectual Property Office, the disclosure of which is incorporated by reference herein in its entirety.

TECHNICAL FIELD

The disclosure relates to an electronic device configured to select a cell and a method for operating the same. More particularly, the disclosure relates to an electronic device configured to reestablish radio resource control (RRC) connection or to perform an RRC release procedure that causes redirection, and a method for operating the same.

BACKGROUND ART

A user equipment (UE) may select a cell and may camp on the selected cell. For example, $3^{rd}$ generation partnership project (3GPP) technical specification (TS) 36.304, or 3GPP TS 38.304 may disclose a criterion for selecting a cell, and the UE may select a cell based on the corresponding criterion and may camp on the selected cell.

The UE may perform cell selection in various situations. For example, the UE may be configured to perform a procedure of RRC connection reestablishment (RRE) based on a radio link failure (RLF) or handover failure. While performing the procedure of RRC connection reestablishment, the UE may search for peripheral cells and may select a specific cell.

Alternatively, the UE may perform an RRC release procedure that causes redirection. For example, when the UE has received an RRC release message from a network that causes redirection, the UE may search for peripheral cells and may select a specific cell.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

As described above, the UE may select a cell based on whether the cell selection criterion is satisfied during a process of performing the RRE procedure or the RRC release procedure. However, if the UE selects a cell solely according to the cell selection criterion of 3GPP TS 36.304, for example, there is a possibility that cell selection will be performed again, or the service will fail to be performed according to the request of the network.

For example, there is a possibility that the UE will be connected to a first core network (CN) based on first radio access technology (RAT) and then select a cell that supports a second core network only during the RRE procedure. If the core network before the RRE and that after the RRE do not match, 3GPP TS 36.331 requires that the UE leave the RRC_Connected state. This requires the UE to unnecessarily reselect a cell, and the RRC connection may be released.

As another example, the UE may receive an RRC release message that requires a specific core network from the network. When the UE selects a cell according to the sell search result and 3GPP standard spec, the UE may camp on a cell that does not support the specific core network required by the network, and this may delay the timepoint at which the service is provided.

Aspects of the disclosure are to address at least the above-mentioned problems and/or disadvantages and to provide at least the advantages described below. Accordingly, an aspect of the disclosure is to provide an electronic device and a method for operating the same that selects a cell based on not only a cell search result, but also a core network that supports each cell, in various cell selection situations.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes at least one processor, wherein the at least one processor is configured to camp on a first cell, perform a procedure for registration with a first core network after camping on the first cell, identify occurrence of an event requiring cell selection in a state registered with the first core network, identify a core network corresponding to the occurred event, identify a core network supported by each of at least one second cell, identify a measurement result of a reference signal respectively associated with at least one third cell supporting the core network corresponding to the occurred event among the at least one second cell, and camp on the identified fourth cell among the at least one third cell based on the measurement result.

In accordance with another aspect of the disclosure, a method of operating an electronic device is provided. The method includes camping on a first cell, performing a procedure for registration in a first core network after camping on the first cell, identifying occurrence of an event requiring cell selection in a state registered with the first core network, identifying a core network corresponding to the occurred event, identifying a core network supported by each of at least one second cell, identifying a measurement result of a reference signal respectively associated with at least one third cell supporting a core network corresponding to the occurred event among the at least one second cell, and camping on the identified fourth cell among the at least one third cell based on the measurement result.

Advantageous Effects

Various embodiments may provide an electronic device and a method for operating the same, wherein in various cell selection situations, a cell can be selected based on not only a cell search result, but also a core network that supports each cell. This may prevent release of RRC connection due to a mismatch between core networks before and after RRE. Moreover, a cell that supports a specific core network required by an RRC release message may be selected, thereby preventing a service delay due to a core network mismatch.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
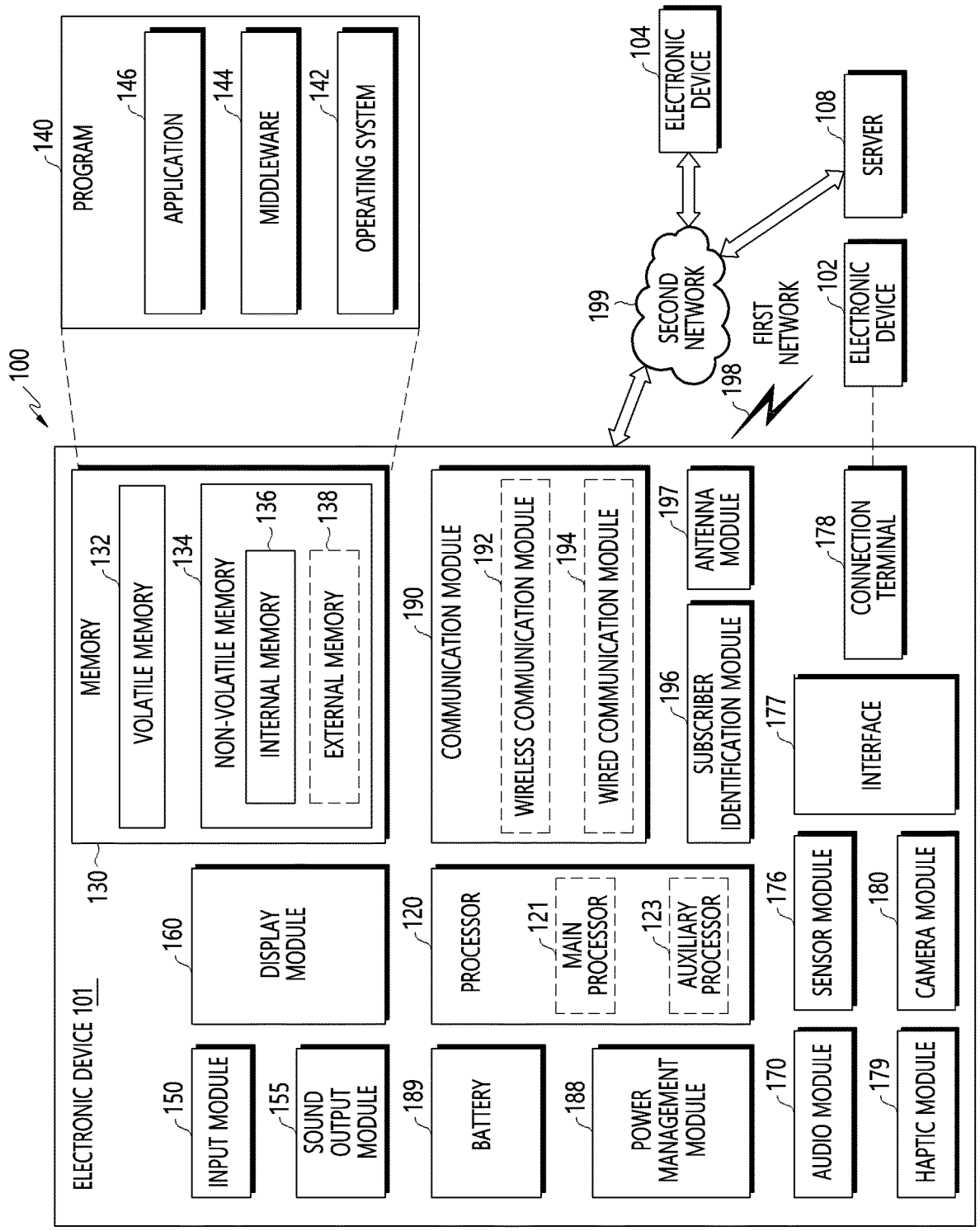
FIG. 1 is a block diagram of an electronic device in a network environment, according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
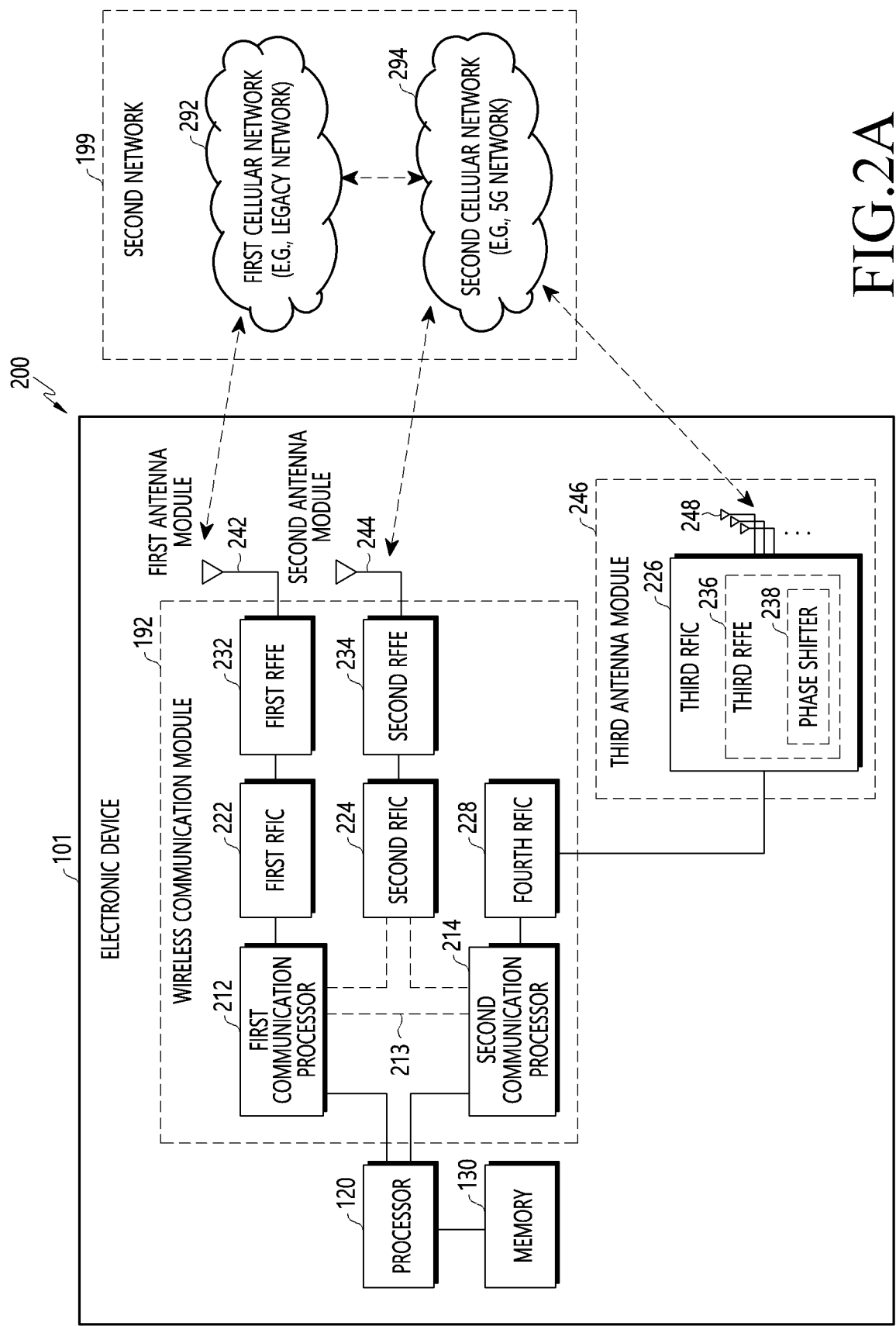
FIGS. 2A and 2B are block diagrams of an electronic device for supporting legacy network communication and 5th generation (5G) network communication, according to various embodiments of the disclosure.
Figure 2B:
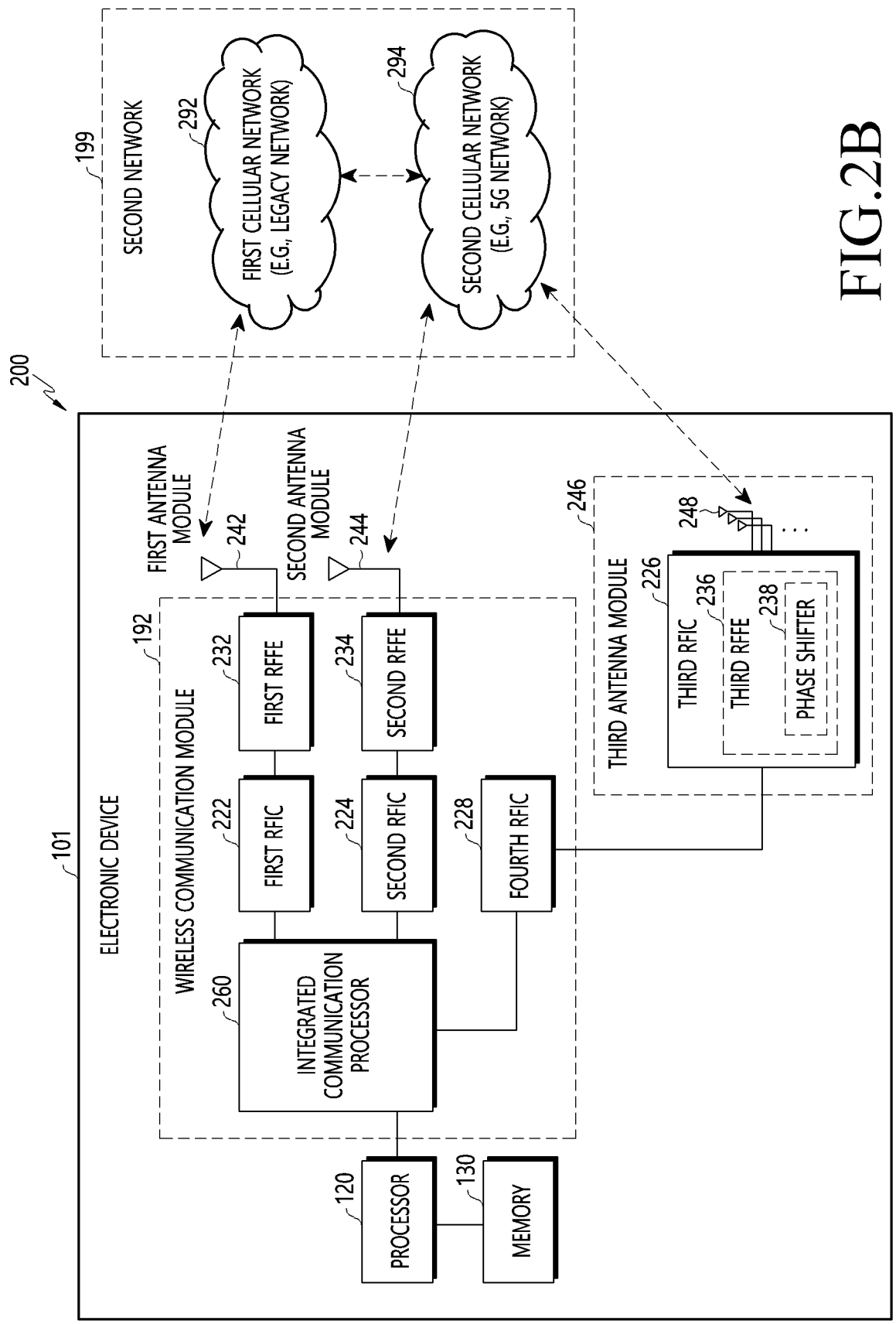

FIGS. 2A and 2B are block diagrams 200 of an electronic device for supporting legacy network communication and 5G network communication according to various embodiments of the disclosure. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. A second network 199 may include a first cellular network 292 and a second cellular network 294. According to another embodiment of the disclosure, the electronic device 101 may further include at least one component among the components illustrated in FIG. 1, and the second network 199 may further include at least one other network. According to an embodiment of the disclosure, the first communication processor 212, the second communication processor 214, the first RFIC 222, the second RFIC 224, the fourth RFIC 228, a first RFFE 232, and a second RFFE 234 may configure at least a part of a wireless communication module 192. According to another embodiment of the disclosure, the fourth RFIC 228 may be omitted or may be included as a part of the third RFIC 226.

The first communication processor 212 may support establishment of a communication channel of a band to be used for wireless communication with the first cellular network 292 and a legacy network communication through the established communication channel According to various embodiments of the disclosure, the first cellular network may be a legacy network including a second generation (2G), 3G, 4G, or Long-Term Evolution (LTE) network. The second communication processor 214 may support establishment of a communication channel corresponding to a designated band (e.g., about 6 GHz to about 60 GHz) among bands to be used for wireless communication with the second cellular network 294 and a 5G network communication through an established communication channel. According to various embodiments of the disclosure, the second cellular network 294 may be a 5G network defined by 3GPP. Additionally, according to an embodiment of the disclosure, the first communication processor 212 or the second communication processor 214 may support establishment of a communication channel corresponding to another designated band (e.g., about 6 GHz or less) among bands to be used for wireless communication with the second cellular network 294 and a 5G network communication through an established communication channel.

The first communication processor 212 may transmit/receive data to and from the second communication processor 214. For example, data that has been classified to be transmitted through the second cellular network 294 may be changed to be transmitted through the first cellular network 292. In this case, the first communication processor 212 may receive transmission data from the second communication processor 214. For example, the first communication processor 212 may transmit and receive data with the second communication processor 214 through an inter-processor interface 213. The inter-processor interface 213 may be implemented as, for example, a universal asynchronous receiver/transmitter (UART), (e.g., high speed-UART (HS-UART) or a peripheral component interconnect bus express physical cell identity (PCIe) interface), but there is no limitation in the type thereof. Alternatively, the first communication processor 212 and the second communication processor 214 may exchange control information and packet data information using, for example, a shared memory. The first communication processor 212 may transmit/receive various information to and from the second communication processor 214, such as detection information, information on output strength, and resource block (RB) allocation information.

Depending on the implementation, the first communication processor 212 may not be directly connected to the second communication processor 214. In this case, the first communication processor 212 may transmit and receive data with the second communication processor 214 through the processor 120 (e.g., an application processor). For example, the first communication processor 212 and the second communication processor 214 may transmit/receive data to and from the processor 120 (e.g., an application processor) through the HS-UART interface or the PCIe interface, but the type of interface is not limited. Alternatively, the first communication processor 212 and the second communication processor 214 may exchange control information and packet data information using a shared memory with the processor 120 (e.g., an application processor).

According to an embodiment of the disclosure, the first communication processor 212 and the second communication processor 214 may be configured in a single chip or a single package. According to various embodiments of the disclosure, the first communication processor 212 or the second communication processor 214 may be configured in a single chip or a single package with the processor 120, a co-processor 123, or a communication module 190. Referring to FIG. 2B, a unified communication processor 260 may support both functions for communication with the first cellular network 292 and the second cellular network 294.

The first RFIC 222 may, on transmission, convert the baseband signal generated by the first communication processor 212 into a radio frequency (RF) signal of about 700 MHz to about 3 GHz used in the first cellular network 292 (e.g., a legacy network). On reception, an RF signal may be obtained from the first network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal to be processed by the first communication processor 212.

The second RFIC 224 may, on transmission, convert the baseband signal generated by the first communication processor 212 or the second communication processor 214 into an RF signal (hereinafter, 5G Sub6 RF signal) of the Sub6 band (e.g., about 6 GHz or less) used for the second cellular network 294 (e.g., a 5G network). On reception, a 5G Sub6 RF signal may be obtained from the second cellular network 294 (e.g., 5G network) through an antenna (e.g., second antenna module 244), and may be preprocessed through an RFFE (e.g., the second RFFE 234). The second RFIC 224 may convert the preprocessed 5G Sub6 RF signal into a baseband signal to be processed by a corresponding one of the first communication processor 212 or the second communication processor 214.

The third RFIC 226 may convert the baseband signal generated by the second communication processor 214 into an RF signal (hereinafter, 5G Above6 RF signal) of the 5G Above6 band (e.g., about 6 GHz to about 60 GHz) to be used in the second cellular network 294 (e.g., a 5G network). On reception, a 5G Above6 RF signal may be obtained from the second cellular network 294 (e.g., 5G network) through an antenna (e.g., antenna 248), and may be preprocessed through a third RFFE 236. The third RFIC 226 may convert the preprocessed 5G Above6 RF signal into a baseband signal to be processed by the second communication processor 214. According to an embodiment of the disclosure, the third RFFE 236 may be configured as a part of the third RFIC 226.

According to an embodiment of the disclosure, the electronic device 101 may include the fourth RFIC 228 separately from or as at least a part of the third RFIC 226. In this case, the fourth RFIC 228 may convert the baseband signal generated by the second communication processor 214 into an RF signal (hereinafter, referred to as an IF signal) of an intermediate frequency band (e.g., about 9 GHz to about 11 GHz), and then transmit the IF signal to the third RFIC 226. The third RFIC 226 may convert the IF signal into a 5G Above6 RF signal. On reception, the 5G Above6 RF signal may be received from the second cellular network 294 (e.g., 5G network) through an antenna (e.g., antenna 248) and converted to an IF signal by the third RFIC 226. The fourth RFIC 228 may convert the IF signal into a baseband signal to be processed by the second communication processor 214.

According to an embodiment of the disclosure, the first RFIC 222 and the second RFIC 224 may be configured as at least a part of a single chip or a single package. According to various embodiments of the disclosure, when the first RFIC 222 and the second RFIC 224 in FIG. 2A or 2B are configured as a single chip or a single package, they may be configured as an integrated RFIC. In this case, the integrated RFIC may be connected to the first RFFE 232 and second RFFE 234 to convert a baseband signal into a signal of a band supported by the first RFFE 232 and/or second RFFE 234, and transmit the converted signal to one of the first RFFE 232 and the second RFFE 234. According to an embodiment of the disclosure, the first RFFE 232 and the second RFFE 234 may be configured as at least a part of a single chip or a single package. According to an embodiment of the disclosure, at least one antenna module of the first antenna module 242 or the second antenna module 244 may be omitted or may be combined with another antenna module to process RF signals of a plurality of corresponding bands.

According to an embodiment of the disclosure, the third RFIC 226 and the antenna 248 may be disposed on the same substrate to configure the third antenna module 246. For example, the wireless communication module 192 or the processor 120 may be disposed on the first substrate (e.g., main PCB). In this case, the third RFIC 226 may be disposed in a partial area (e.g., bottom) of the second substrate (e.g., sub PCB) separate from the first substrate and the antenna 248 may be disposed in another partial area (e.g., top), thereby configuring the third antenna module 246. By disposing the third RFIC 226 and the antenna 248 on the same substrate, it is possible to reduce the length of the transmission line therebetween. This, for example, may reduce loss (e.g., attenuation) of a signal in a high-frequency band (e.g., about 6 GHz to about 60 GHz) used for 5G network communication by the transmission line. Accordingly, the electronic device 101 may improve the quality or speed of communication with the second network 294 (e.g., a 5G network).

According to an embodiment of the disclosure, the antenna 248 may be configured as an antenna array including a plurality of antenna elements that may be used for beamforming. In this case, the third RFIC 226 may include, for example, as part of the third RFFE 236, a plurality of phase shifters 238 corresponding to a plurality of antenna elements. On transmission, each of the plurality of phase shifters 238 may convert the phase of a 5G Above6 RF signal to be transmitted to the outside of the electronic device 101 (e.g., a base station of a 5G network) through a corresponding antenna element. On reception, each of the plurality of phase shifters 238 may convert the phase of the 5G Above6 RF signal received from the outside through a corresponding antenna element into the same or substantially the same phase. This enables transmission or reception through beamforming between the electronic device 101 and the outside.

The second cellular network 294 (e.g., 5G networks) may operate independently (e.g., stand alone (SA)) of the first cellular network 292 (e.g., legacy networks) or may be connected and operated (e.g., non-stand alone (NSA)). For example, a 5G network may have only an access network (e.g., a 5G radio access network (RAN) or a next generation RAN (NG RAN)), and may not have a core network (e.g., a next generation core (NGC)). In this case, after accessing the access network of the 5G network, the electronic device 101 may access an external network (e.g., the Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network is stored in the memory 130 and may be accessed by other components (e.g., the processor 120, the first communication processor 212, or the second communication processor 214).

Figure 3:
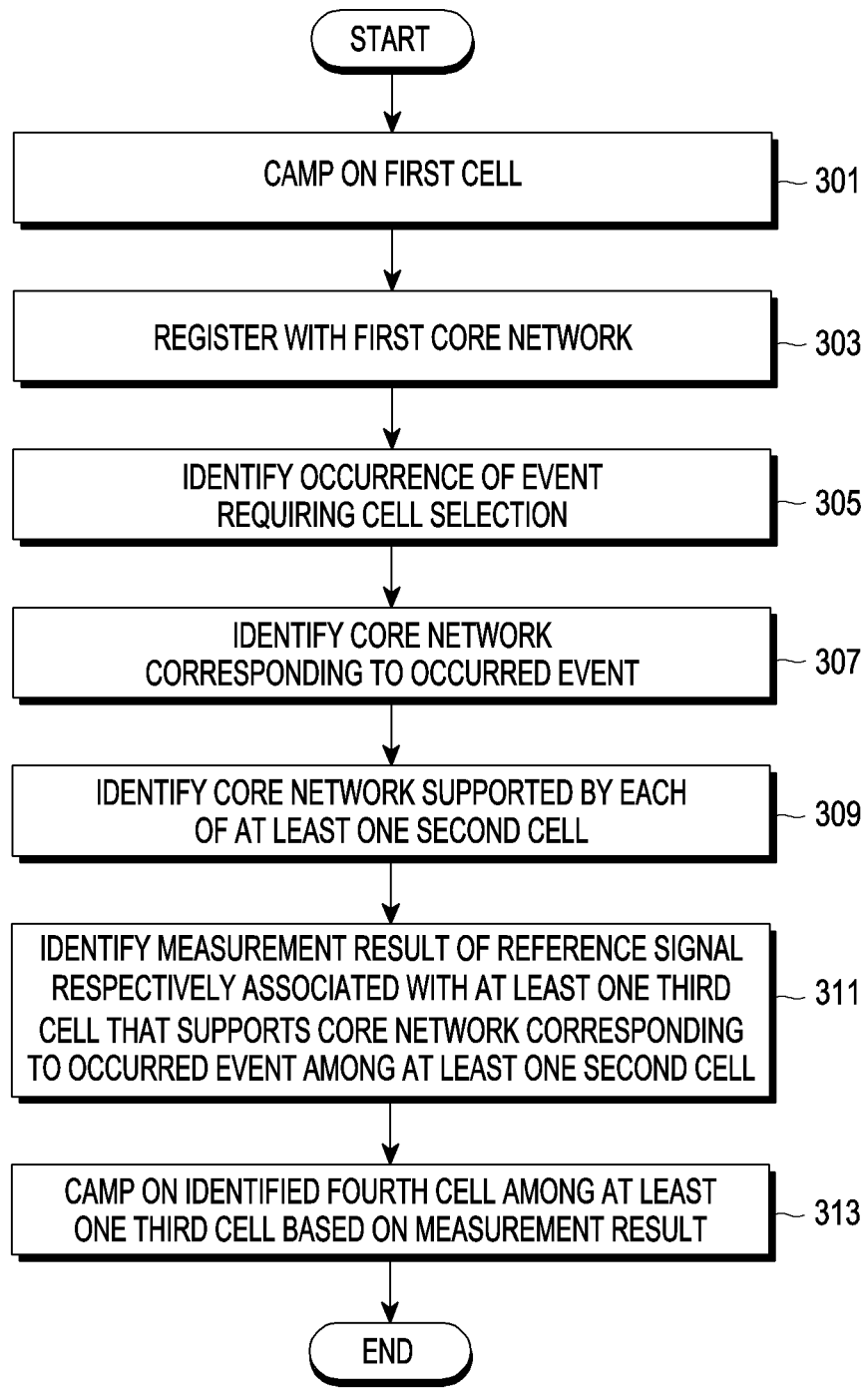
FIG. 3 is a flowchart illustrating a method of operating an electronic device according to an embodiment of the disclosure.

FIG. 3 is a flowchart illustrating a method of operating an electronic device according to an embodiment of the disclosure.

Referring to FIG. 3, according to various embodiments of the disclosure, the electronic device 101 (e.g., at least one of the processor 120, the first communications processor 212, the second communications processor 214, or the unified communications processor 260) may camp on a first cell in operation 301. For example, the electronic device 101 may select a cell or reselect a cell based on the procedure disclosed in 3GPP TS 36.304 or 3GPP TS 38.304, and there is no limitation on the cell selection method or the cell reselection method. The electronic device 101 may, for example, select a suitable cell to camp on for access to an available service, but the electronic device 101 may select any cell, and it will be appreciated by those skilled in the art that various embodiments are not limited to a camping on state for an appropriate cell. The electronic device 101 may camp on the selected cell. The electronic device 101 may perform camping on by tuning to a control channel of the selected cell. The electronic device 101 may perform at least one of receiving system information from public land mobile network (PLMN), receiving registration area information (e.g., tracking area information) from PLMN, receiving other AS and NAS information, receiving paging and notification messages from the PLMN (if it is registered with the core network), or initiation of transfer to connected mode by tuning to the control channel of the selected cell.

According to various embodiments of the disclosure, the electronic device 101 may register with a first core network in operation 303. For example, the electronic device 101 may perform a registration procedure with the first core network based on the first cell camped on. The electronic device 101 may perform registration with the first core network by, for example, performing a procedure according to 3GPP TS 24.301 or 3GPP TS 23.502, but there is no limitation. The electronic device 101 may register, for example, with an evolved packet core (EPC) or a 5$^{th}$ generation core (5GC), and there is no limitation on the type of the first core network.

According to various embodiments of the disclosure, in operation 305, the electronic device 101 may identify occurrence of an event requiring cell selection. In operation 307, the electronic device 101 may identify a core network corresponding to the occurred event. For example, the event may be an event requiring registration with a specific core network.

In an example, the event may be an RRE procedure. In the event of the RRE procedure, when the core network registered after RRC connection reestablishment is different from the core network before RRC connection reestablishment, for example the first core network, RRC connection failure may occur, and thus the core network before and after RRC connection reestablishment needs to be the same. 3GPP TS 36.331 discloses an RRE procedure. For example, a procedure when the electronic device 101 selects an appropriate cell of E-UTRA from among the RRE procedures is reflected in 3GPP TS 36.331. After the electronic device 101 is registered with 5GC before RRC connection reestablishment, there is a possibility that the cell selected by the electronic device 101 in the RRE procedure is connected only to the EPC. Alternatively, after the electronic device 101 is registered with the EPC before RRC connection reestablishment, there is a possibility that the cell selected by the electronic device 101 in the RRE procedure is connected only to 5GC. In 3GPP TS 36.331, in both cases, it is disclosed that the electronic device 101 performs an action corresponding to leaving the RRC_Connected state. Actions upon leaving the RRC_Connected or RRC_Inactive will be described later. When an event of the RRE procedure is identified, the electronic device 101 may identify a core network registered before RRC connection reestablishment as a core network corresponding to the occurred event.

In another example, the event may be an RRC release procedure causing a redirection. The electronic device 101 may receive an RRC release message that causes redirection from the network. The RRC release message may be, for example, an RRCRelease message of 3GPP TS 38.331 or an RRCConnectionRelease message of 3GPP TS 36.331, and there is no limitation. The RRC release message may include information indicating the core network of the redirection target. When the RRC release message is redirected to a core network different from the designated core network, the provision of the service required by the electronic device 101 may be delayed, which will be described later. When the event of the RRC release procedure is identified, the electronic device 101 may identify the core network identified from the RRC release message as a core network corresponding to the occurred event.

According to various embodiments of the disclosure, in operation 309, the electronic device 101 may identify a core network supported by each of at least one second cell. The at least one second cell may include the first cell. The electronic device 101 may perform a cell search, and may identify at least one second cell as a result of the cell search. The electronic device 101 may identify system information corresponding to each of the at least one second cell, for example, a system information block (SIB) 1. The electronic device 101 may identify a core network supported by each of the at least one second cell based on system information,
for example, information included in SIB 1. Table 1 is an example of SIB 1 (e.g., SystemInformationBlockType1).

TABLE 1

- TS 36.331: 6.2.2 Message definitions
- SystemInformationBlockType1
PLMN-IdentityInfo ::= SEQUENCE {
  plmn-Identity    PLMN-Identity,
  cellReservedForOperatorUse    ENUMERATED {reserved, notReserved}
}
PLMN-IdentityInfo-r15 ::= SEQUENCE {
  plmn-Identity-5GC-r15 CHOICE{
    plmn-Identity-r15    PLMN-Identity,
    plmn-Index-r15 INTEGER (1..maxPLMN-r11)
  }, In SIB 1 in Table 1, "PLMN-IdentityInfo" including "plmn-Identity" and/or "PLMN-IdentityInfo-r15" including "plmn-Identity-5GC-r15" may be included. For example, when "PLMN-IdentityInfo" is included in SIB 1, it may refer to that the cell corresponding to SIB 1 supports EPC. For example, when "PLMN-IdentityInfo-r15" is included in SIB 1, it may refer to that the cell corresponding to SIB 1 supports 5GC. Meanwhile, it will be appreciated by those skilled in the art that the information of SIB 1 of Table 1 may be used without limitation as long as it is information capable of determining a core network supported by a specific cell.

According to various embodiments of the disclosure, the electronic device 101, in operation 311, may check a measurement result of a reference signal (or synchronization signal) associated with at least one third cell supporting a core network corresponding to an event occurred among at least one second cell. For example, when the core network corresponding to the occurred event is the EPC, the electronic device 101 may check a measurement result of a measurement signal of a reference signal associated with at least one third cell supporting EPC among at least one second cell. For example, when the core network corresponding to the occurred event is 5GC, the electronic device 101 may check a measurement result of a measurement signal of a reference signal associated with at least one third cell supporting 5GC among at least one second cell. In operation 313, the electronic device 101 may camp on the identified fourth cell among the at least one third cell based on the measurement result. In an example, the electronic device 101 may identify a fourth cell having the highest measurement strength (e.g., reference signal received power (RSRP)), reference signal received quality (RSRQ), signal to interference noise ratio (SINR), received signal strength indicator (RS SI), and/or signal-to-noise ratio (SNR) of a reference signal among at least one third cell, but there is no limitation on a method of identifying the fourth cell. Referring to FIG. 3, although the electronic device 101 is illustrated as performing a measurement on at least one third cell supporting a specific core network, this is exemplary, and it will be appreciated by those skilled in the art that the electronic device 101 may perform the measurement for the entirety of the at least one second cell. When measurement is performed on all of the at least one second cell, the electronic device 101 may camp on by identifying a fourth cell based on a measurement result of at least one third cell supporting a core network corresponding to a specific event.

As described above, the electronic device 101 may camp on a cell supporting the core network corresponding to the event that has occurred. Accordingly, actions upon leaving the RRC connected or RRC inactive based on the difference between the core network in which the electronic device 101 is registered before the RRE procedure and the core network of the cell camped on during the RRE procedure may be prevented. Alternatively, by camping on a cell supporting a core network different from the core network designated in the RRC release message, service delay may also be prevented.

Figure 4:
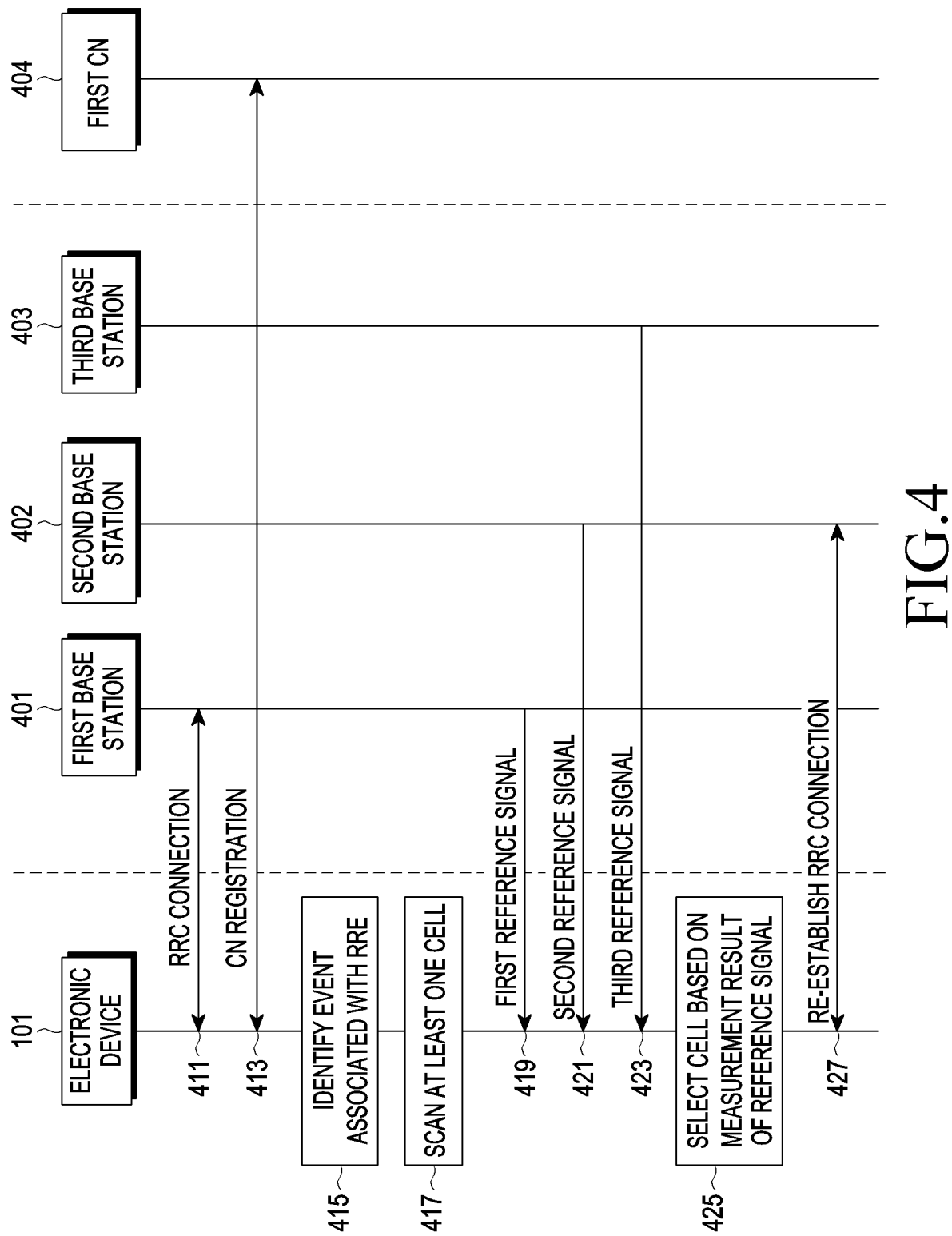
FIG. 4 is a flowchart illustrating a method of operating an electronic device and a comparative example for comparison according to an embodiment of the disclosure.

FIG. 4 is a flowchart illustrating a method of operating an electronic device and a comparative example for comparison according to an embodiment of the disclosure. Meanwhile, at least some of the actions of the electronic device 101 according to the comparative example illustrated in FIG. 4 may be performed by the electronic device 101 according to various embodiments.

Referring to FIG. 4, in operation 411, the electronic device 101 (e.g., at least one of the processor 120, the first communications processor 212, the second communications processor 214, or the unified communications processor 260) may establish an RRC connection with the first base station 401. After camping on the first base station 401, the electronic device 101 may perform a procedure of establishing an RRC connection with the first base station 401. For example, the first base station 401 may support the RAT of E-UTRA, but there is no limitation. In operation 413, the electronic device 101 may perform registration with a first core network 404 based on the first base station 401. The electronic device 101 may perform registration with the first core network 404 by, for example, performing a procedure according to 3GPP TS 24.301 (or 3GPP TS 24.501) or 3GPP TS 23.502, but there is no limitation. The electronic device 101 may, for example, register with the EPC or register with the 5GC, and there is no limitation on the type of the first core network 404.

In operation 415, the electronic device 101 may identify an event related to the RRE. The electronic device 101 may identify, for example, detection of radio link failure (RLF) as an event related to RRE. The electronic device 101 may identify, for example, detection of a handover failure as an event related to the RRE. The electronic device 101 may identify an event related to the RRE based on, for example, mobility from E-UTRA failure. The electronic device 101 may identify, for example, an integrity check failure as an event related to the RRE. The electronic device 101 may identify, for example, an RRC connection reconfiguration failure as an RRE-related event. The electronic device 101 may be configured to perform a cell selection procedure based on the confirmation of an event related to the RRE.

In operation 417, the electronic device 101 may scan at least one cell. The first base station 401 may transmit a first reference signal (or a synchronization signal) in operation 419. The second base station 402 may transmit a second reference signal in operation 421. The third base station 403 may transmit a third reference signal in operation 423. The electronic device 101 may measure the intensity of each of the first reference signal, the second reference signal, and the third reference signal. In operation 425, the electronic device 101 may select a cell based on the measurement result of the reference signal. For example, the electronic device 101 may select a cell having the greatest measurement intensity of the reference signal. Although not illustrated, the electronic device 101 may receive system information of each of the first base station 401, the second base station 402, and the third base station 403, and may check whether the cell selection criterion is satisfied based on the received system information. The electronic device 101 may select a cell having the greatest measurement intensity among cells satisfying the cell selection criterion. In various embodiments of the disclosure, selecting a specific cell by the electronic device 101 may be used interchangeably with selecting a specific base station (e.g., the second base station 402). In FIG. 4, it is assumed that the measurement intensity of the second reference signal is the largest. In operation 427, the electronic device 101 may re-establish an RRC connection with the second base station 402. If the second base station 402 supports the first core network 404 in which the electronic device 101 is registered, the electronic device 101 may perform a re-establishment procedure of the RRC connection with the second base station 402. For example, the electronic device 101 may transmit a PRACH preamble, receive a random access response, transmit an RRC connection re-establishment request message, receive an RRC connection re-establishment message, and transmit an RRC connection re-establishment complete message, which will be described later. The electronic device 101 may perform communication based on the re-established RRC connection.

Figure 5:
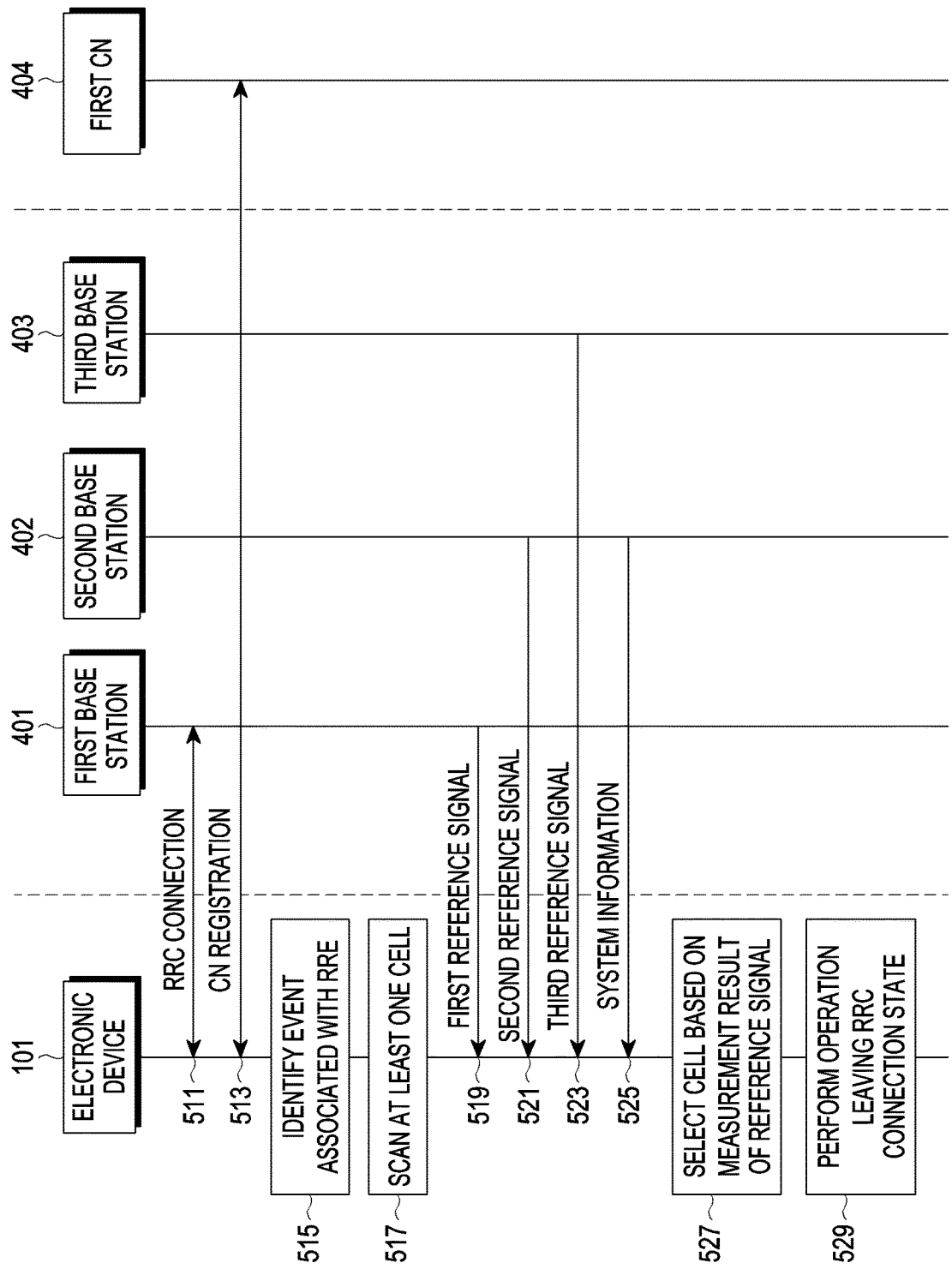
FIG. 5 is a flowchart illustrating a method of operating an electronic device and a comparative example for comparison according to an embodiment of the disclosure.

FIG. 5 is a flowchart illustrating a method of operating an electronic device and a comparative example for comparison according to an embodiment of the disclosure. Meanwhile, at least some of the actions of the electronic device 101 according to the comparative example illustrated in FIG. 5 may be performed by the electronic device 101 according to various embodiments.

Referring to FIG. 5, in operation 511, the electronic device 101 (e.g., at least one of the processor 120, the first communications processor 212, the second communications processor 214, or the unified communications processor 260) may establish an RRC connection with the first base station 401. After camping on the first base station 401, the electronic device 101 may perform a procedure of establishing an RRC connection with the first base station 401. In operation 513, the electronic device 101 may perform registration with the first core network 404 based on the first base station 401. In operation 515, the electronic device 101 may identify an event related to the RRE. The electronic device 101 may be configured to perform a cell selection procedure based on the identification of an event related to the RRE. In operation 517, the electronic device 101 may scan at least one cell.

For example, the first base station 401 may transmit a first reference signal (or a synchronization signal) in operation 519. The second base station 402 may transmit a second reference signal in operation 521. The third base station 403 may transmit a third reference signal in operation 523. The electronic device 101 may measure the intensity of each of the first reference signal, the second reference signal, and the third reference signal. In operation 525, the electronic device 101 may receive system information from the second base station 402. Although not illustrated, the electronic device 101 may receive system information from base stations 401 and 403 other than the second base station 402. The electronic device 101 may identify a parameter constituting a cell selection criterion (e.g., a parameter constituting a cell selection criterion of 3GPP TS 36.304) based on system information from the second base station 402. The electronic device 101 may confirm that the measurement result of the second reference signal is satisfied with the cell selection condition based on the checked parameter. In addition, the electronic device 101 may identify that the measurement intensity of the second reference signal is the maximum.

In operation 527, the electronic device 101 may select a second cell corresponding to the second base station 402 based on the measurement result of the reference signal. Meanwhile, in the example of FIG. 5, it is assumed that the second base station 402 does not support the first core network 404 but supports the second core network (not illustrated). As described above, after the electronic device 101 is registered with 5GC before RRC connection re-establishment, when the cell selected by the electronic device 101 in the RRE procedure is connected only to the EPC, or after the electronic device 101 is registered with the EPC before the RRC connection re-establishment, when the cell selected by the electronic device 101 in the RRE procedure is connected only to 5GC, in 3GPP TS 36.331, the electronic device 101 is disclosed to perform an operation leaving the RRC_Connected state. When the second base station 402 supports only the second core network (not illustrated) while the electronic device 101 is registered with the first core network 404, the electronic device 101 may perform a leaving the RRC_connection state according to 3GPP TS 36.331. The electronic device 101 may leave the RRC_connection state because of an RRC connection failure.

As actions upon leaving the RRC_Connected or RRC_Inactive, the electronic device 101 may include at least one of a MAC reset action, a cell reselection priority information discard action, an action of notifying an upper layer that access barring is applicable to all access categories except for categories '0' and '2', an action of performing the action disclosed in 5.3.16.4 of 3GPP TS 36.331, an action of re-establishing the RLC entity for all SRBs and DRBs, an action of storing the UE AS context including the current RRC configuration, an action to save the current security context, an action to store the PDCP state including the ROHC state, an action of storing the C-RNTI used in the source PCell, an action of storing the physical cell identity and cellIdentity of the source PCell, an action to save resumeIdentity, an action to store nextHopChainingCount, an action to save drb-ContinueROHC, an action of suspending all SRBs and DRBs, an action of notifying the upper layer of the suspension of the RRC connection, an action of configuring lower layers to defer integrity protection and encryption, an action of discarding the UE inactive AS context, an rrc_InactiveConfig release action, a KeNB discard action, an rrc_InactiveConfig release action, all radio resources release action, an action of notifying the release of the RRC connection to the upper layer along with the release condition, an action to apply rclwi-Configuraiton, a wlan-OffloadConfigDedicated release action, an action of entering RRC Idle state, an LWA setting release action, or an LWIP release action.

Accordingly, as the electronic device 101 leaves the RRC_connection state, the time when the electronic device 101 can perform communication may be delayed.

Figure 6:
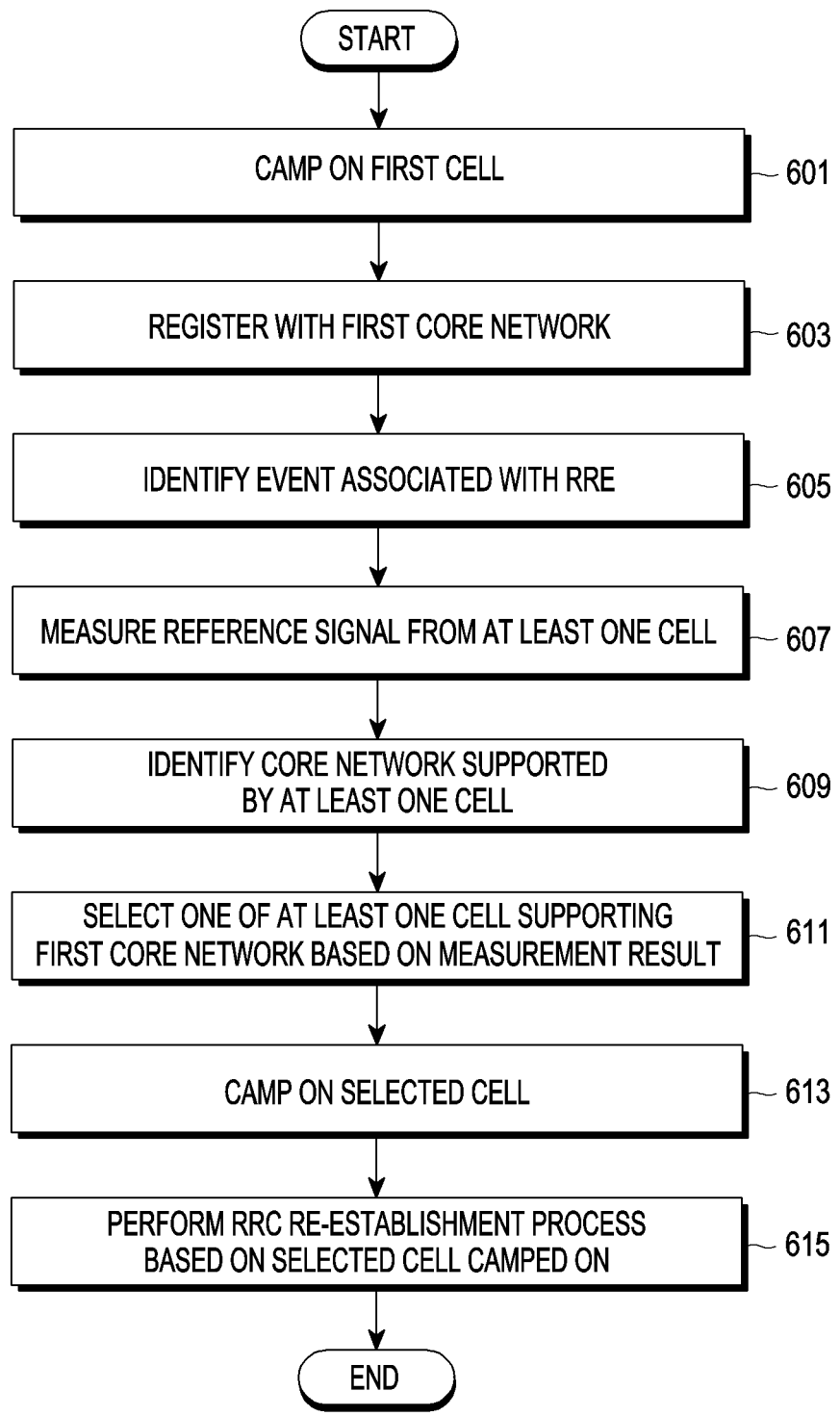
FIG. 6 is a diagram illustrating a method of operating an electronic device according to an embodiment of the disclosure.

FIG. 6 is a diagram illustrating a method of operating an electronic device according to an embodiment of the disclosure.

Referring to FIG. 6, according to various embodiments of the disclosure, the electronic device 101 (e.g., at least one of the processor 120, the first communications processor 212, the second communications processor 214, or the unified communications processor 260) may camp on the first cell in operation 601. The electronic device 101 may register with the first core network based on the first cell in operation 603. The electronic device 101 may perform registration with the first core network by, for example, performing a procedure according to 3GPP TS 24.301 or 3GPP TS 23.502, but there is no limitation. The electronic device 101 may, for example, register with the EPC or the 5GC, and there is no limitation on the type of the first core network.

In operation 605, the electronic device 101 according to various embodiments may confirm an event related to the RRE. The electronic device 101 may, for example, identify at least one of RLF detection, handover failure detection, mobility from E-UTRA failure, integrity check failure, and RRC connection re-establishment failure as an RRE-related event. In operation 607, the electronic device 101 may measure a reference signal (or a synchronization signal) from at least one cell. In operation 609, the electronic device 101 may identify a core network supported by at least one cell. As described above, the electronic device 101 may receive SIB 1 from each of at least one cell. The electronic device 101 may identify whether the corresponding cell supports EPC and/or 5GC based on whether "PLMN-IdentityInfo" and/or "PLMN-IdentityInfo-r15" are included in SIB 1.

According to various embodiments of the disclosure, in operation 611, the electronic device 101 may select one of at least one cell supporting the first core network based on the measurement result. In operation 613, the electronic device 101 may camp on the selected cell. The electronic device 101 may receive information from the cell (or PLMN) by tuning to the control channel of the selected cell. For example, when the electronic device 101 is registered with the EPC before identifying the event related to the RRE, the electronic device 101 may select one of at least one cell supporting the EPC. For example, the electronic device 101 may select one of at least one cell that does not include "plmn-Identity-5GC-r15" in SIB 1. There is no limitation on a method in which the electronic device 101 selects one of at least one cell supporting EPC. For example, the electronic device 101 may select a cell having a maximum measurement size of a reference signal (or a synchronization signal) from among at least one cell supporting EPC. Alternatively, even if the measurement size is not the maximum, the electronic device 101 may select one of the cells in which the measurement result satisfies the cell selection criterion. Alternatively, when there is no cell satisfying the cell selection criterion, the electronic device 101 may select any cell. According to the implementation, when an appropriate cell supporting EPC is not found and only an appropriate cell supporting 5GC is found, the electronic device 101 may be configured to perform an operation leaving the RRC_connection state and camp on any one of the cells supporting 5GC.

For example, when the electronic device 101 is registered with 5GC before identifying an event related to RRE, the electronic device 101 may select one of at least one cell supporting 5GC. For example, the electronic device 101 may select one of at least one cell including "plmn-Identity-5GC-r15" in SIB 1. There is no limitation on a method in which the electronic device 101 selects one of at least one cell supporting 5GC. For example, the electronic device 101 may select a cell having a maximum measurement size of a reference signal (or a synchronization signal) from among at least one cell supporting 5GC. Alternatively, even if the measurement size is not the maximum, the electronic device 101 may select one of the cells in which the measurement result satisfies the cell selection criterion. Alternatively, when there is no cell satisfying the cell selection criterion, the electronic device 101 may select any cell. According to the implementation, when an appropriate cell supporting 5GC is not found and only an appropriate cell supporting EPC is found, the electronic device 101 may be configured perform an operation leaving the RRC_connection state and camp on any one of the cells supporting 5GC.

In operation 615, the electronic device 101 may perform an RRC re-establishment procedure based on the selected cell camped on. As the electronic device 101 camps on a cell supporting the previously registered core network, a leaving the RRC_connection state due to the inconsistency of the core network may be prevented from being performed.

Figure 7:
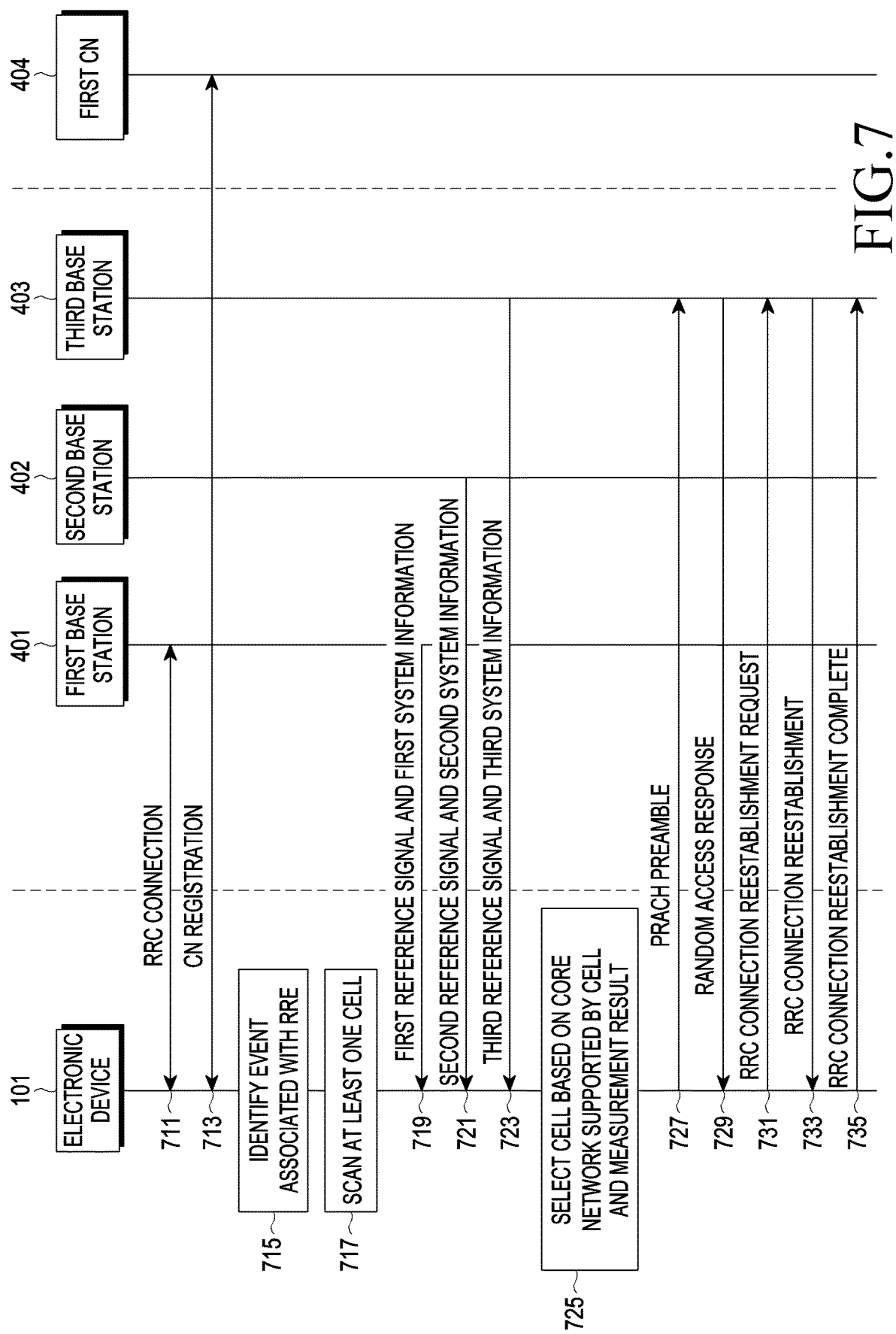
FIG. 7 is a flowchart illustrating a method of operating an electronic device according to an embodiment of the disclosure.

FIG. 7 is a flowchart illustrating a method of operating an electronic device according to an embodiment of the disclosure.

Referring to FIG. 7, according to various embodiments of the disclosure, in operation 711, the electronic device 101 (e.g., at least one of the processor 120, the first communications processor 212, the second communications processor 214, or the unified communications processor 260) may establish an RRC connection with the first base station 401. After camping on the first base station 401, the electronic device 101 may perform a procedure of establishing an RRC connection with the first base station 401. In operation 713, the electronic device 101 may perform registration with the first core network 404 based on the first base station 401. In operation 715, the electronic device 101 may identify an event related to the RRE. The electronic device 101 may be configured to perform a cell selection procedure based on the confirmation of an event related to the RRE. In operation 717, the electronic device 101 may scan at least one cell.

For example, the first base station 401 may transmit a first reference signal (or a synchronization signal) and first system information in operation 719. The second base station 402 may transmit the second reference signal and the second system information in operation 721. The third base station 403 may transmit a third reference signal and third system information in operation 723. Meanwhile, for convenience of description, the base stations 401, 402, and 403 are illustrated as transmitting the reference signal and the system information at the same time, it will be appreciated by those skilled in the art that each of the base stations 401, 402, and 403 may transmit a reference signal and system information at different times rather than simultaneously. The electronic device 101 may identify the core network supported by the first base station 401 based on the first system information, the core network supported by the second base station 402 based on the second system information, and the core network supported by the third base station 403 based on the third system information. For example, the electronic device 101, based on whether "plmn-Identity-5GC-r15" is included in each of the first system information, the second system information, and the third system information, may identify which core network of the EPC or 5GC is supported by each of the first base station 401, the second base station 402, and the third base station 403. Meanwhile, a method of identifying a supported core network based on whether or not "plmn-Identity-5GC-r15" is included in the system information (e.g., SIB 1) is merely an example, and there is no limit to the method of supporting a supported core network.

According to various embodiments of the disclosure, in operation 725, the electronic device 101 may select a third cell based on a core network supported by the cell and a measurement result. For example, because the electronic device 101 is registered with the first core network 404 before the RRE procedure, the electronic device 101 may identify the previously registered first core network 404 as a core network corresponding to the event. For example, in an embodiment of FIG. 7, it is assumed that the first base station 401 and the third base station 403 support the first core network 404 and the second base station 402 supports the second core network (not illustrated). The electronic device 101 may select one of the first base station 401 and the third base station 403 supporting the first core network 404 identified as the core network corresponding to the event. In an embodiment of FIG. 7, the electronic device 101 may select the third base station 403. In an example, the electronic device 101 may select the third base station 403 based on that the measured intensity of the third reference signal from the third base station 403 is greater than the measured intensity of the first reference signal from the first base station 401. If there are three or more base stations supporting the first core network 404, the electronic device 101 may select a cell having the maximum measurement strength of the reference signal. As another example, the electronic device 101 may select the third base station 403 based on the measurement result of the third reference signal from the third base station 403 satisfying the cell selection condition. In another example, the electronic device 101 may select the third base station 403 based on that the first base station 401 is barred. In another example, the electronic device 101 may perform any cell selection based on the confirmation that the third base station 403 is an acceptable cell. A method of selecting one of a plurality of cells supporting a specific core network may follow, for example, 3GPP TS 36.304, but this is also exemplary and not limited. In an embodiment of FIG. 7, even when the measurement strength of the second reference signal is greater than the measurement strength of the third reference signal, the electronic device 101 may be configured not to select the second cell based on the fact that the second cell does not support a specific core network.

According to various embodiments of the disclosure, the electronic device 101 may perform an RRC connection re-establishment procedure for the selected third cell. In operation 727, the electronic device 101 may transmit a PRACH preamble to the third base station 403 corresponding to the third cell. In operation 729, the third base station 403 may transmit a random access response to the electronic device 101 in response to reception of the PRACH preamble. In operation 731, the electronic device 101 may transmit an RRC connection reestablishment request message to the third base station 403 corresponding to the third cell in response to receiving the random access response. In operation 733, the third base station 403 may transmit an RRC connection reestablishment message to the electronic device 101 in response to the reception of the RRC connection reestablishment request. In operation 735, the electronic device 101 may transmit an RRC connection reestablishment complete message to the third base station 403 corresponding to the third cell in response to receiving the RRC connection reestablishment message. Based on the above-described procedure, the RRC connection may be re-established between the electronic device 101 and the third base station 403 corresponding to the third cell, and the electronic device 101 may perform communication without leaving the RRC connection state.

Figure 8A:
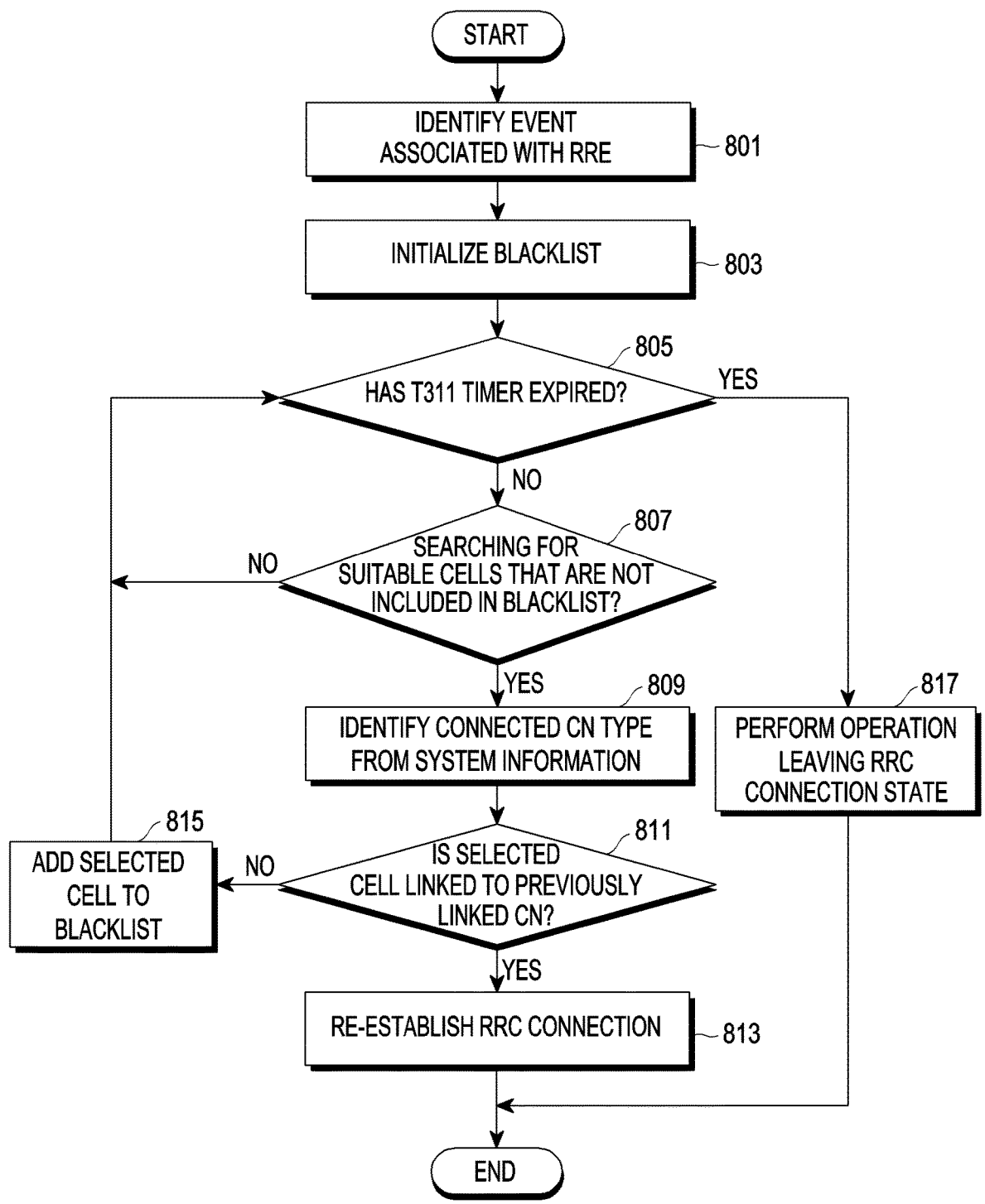
FIG. 8A is a flowchart illustrating a method of operating an electronic device according to an embodiment of the disclosure.

FIG. 8A is a flowchart illustrating a method of operating an electronic device according to an embodiment of the disclosure.

Referring to FIG. 8A, according to various embodiments of the disclosure, in operation 801, the electronic device 101 (e.g., at least one of the processor 120, the first communications processor 212, the second communications processor 214, or the unified communications processor 260) may identify an event related to the RRE. Examples of the RRE related event have been described above, so a detailed description thereof will be omitted. In an embodiment of FIG. 8A, it is assumed that the electronic device 101 identifies an RRC-related event in a state of being registered with the first core network. In operation 803, the electronic device 101 may initialize a black list. The black list may include, for example, information about a cell that does not support the first core network. The black list may be stored, for example, in a memory (e.g., the memory 130 of FIG. 1) at least a part of the manufacturing time of the electronic device 101 and/or the operating time of the electronic device 101. For example, the information about the cell may include at least one of a physical cell identity (PCI) and a frequency (e.g., ARFCN). Alternatively, the electronic device 101 may replace the black list and store information about the cell and the supporting core network information in association. Table 2 is an example of a list replacing the black list. Table 2, in contrast to a black list indicating a target for which connection should not be performed, may indicate parameters for identifying a cell and association information with a corresponding core network.

TABLE 2

| PCI | ARFCN | Supporting CN |
|---|---|---|
| PCI #1 | ARFCN #1 | EPC |
| PCI #2 | ARFCN #2 | EPC |
| PCI #3 | ARFCN #3 | 5GC |

In Table 2, although both PCI and AFRCN are illustrated as reflected, it would be appreciated by those skilled in the art that only one of both parameters may be controlled by the electronic device 101 and an additional parameter for identifying a cell may be additionally controlled. Depending on the implementation, the operation of initializing the black list may be omitted.

According to various embodiments of the disclosure, in operation 805, the electronic device 101 may identify whether the T311 timer expires. The T311 timer may be initiated, for example, based on confirmation of an event associated with the RRE. If the T311 timer has not expired (805—No), the electronic device 101 may identify whether a suitable cell not included in the black list is searched for in operation 807. If an appropriate cell included in the black list is found (807—No), the electronic device 101 may identify whether the T311 timer has expired again in operation 805 and search for another cell. If the information for identifying a cell as illustrated in Table 2 not the black list and the related information between the supporting core network is controlled, the electronic device 101 may identify whether the found appropriate cell supports the core network in which the electronic device 101 is registered.

When an appropriate cell not included in the black list is found (807—Yes), in operation 809, the electronic device 101 may identify the type of the connected core network from the system information of the corresponding cell. For example, the electronic device 101 may identify a possible core network type based on whether "plmn-Identity-5GC-r15" is included in SIB 1 of the corresponding cell.

According to various embodiments of the disclosure, in operation 811, the electronic device 101 may identify whether the selected cell is connected to a core network to which the electronic device 101 is previously connected. The electronic device 101 may identify whether the core network to which the electronic device 101 was connected before the RRE and the core network supported by the selected cell are the same or different based on the possible core network type identified based on the 809 operation. When the selected cell is connected to the previously connected core network (811—Yes), the electronic device 101 may perform an RRC connection re-establishment procedure in operation 813. If the selected cell is not connected to the core network to which the electronic device 101 is previously connected (811—No), the electronic device 101 may add the selected cell to the black list in operation 815. Thereafter, in operation 805, the electronic device 101 may identify again whether the T311 timer has expired. If it is determined that the T311 timer has expired (805—Yes), the electronic device 101 may perform a leaving the RRC connection state in operation 817.

Figure 8B:
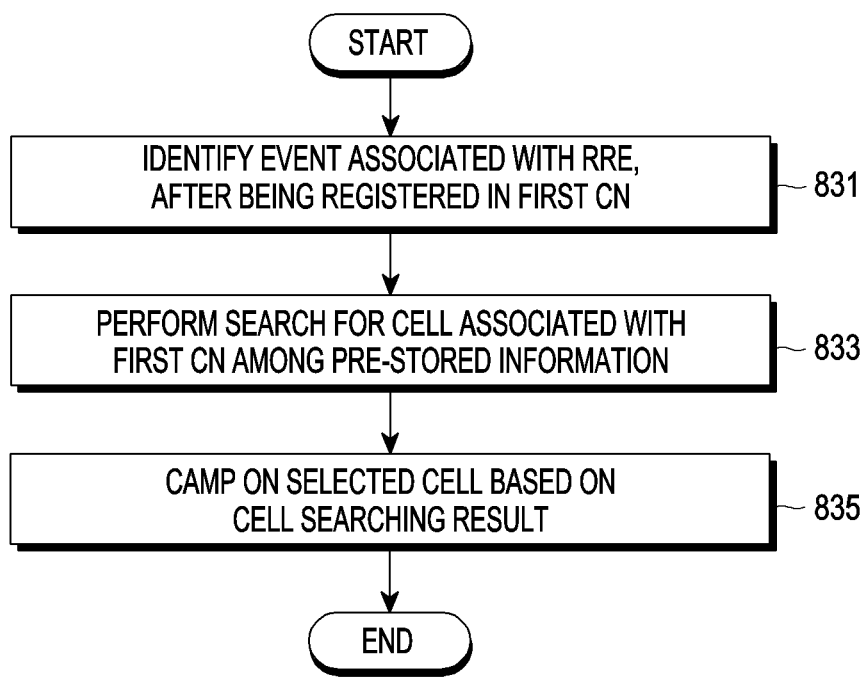
FIG. 8B is a flowchart illustrating a method of operating an electronic device according to an embodiment of the disclosure.

FIG. 8B is a flowchart illustrating a method of operating an electronic device according to an embodiment of the disclosure.

Referring to FIG. 8B, according to various embodiments of the disclosure, in operation 831, the electronic device 101 (e.g., at least one of the processor 120, the first communications processor 212, the second communications processor 214, or the unified communications processor 260) may identify an event related to the RRE after being registered with the first core network. In operation 833, the electronic device 101 may perform a search for a cell associated with the first core network among previously stored information. For example, the electronic device 101 may support a plurality of frequencies, and may be configured to search for a cell by performing an RF scan on the plurality of frequencies. Meanwhile, for example, the electronic device 101 may store information on a supported network for each frequency (ARFCN) as illustrated in Table 2. Accordingly, the electronic device 101 may not perform an RF scan for a frequency that does not support the first core network. For example, when the electronic device 101 has been registered with the EPC, the electronic device 101 may be configured not to perform an RF scan for ARFCN #3, which is confirmed not to support the EPC. Accordingly, by not performing an RF scan that does not support a specific core network, the electronic device 101 may prevent the electronic device 101 from leaving the RRC_connection state later.

According to various embodiments of the disclosure, in operation 835, the electronic device 101 may camp on a cell selected based on a cell search result. In operation 833, because the RF scan for a frequency that does not support the first core network is not performed, the probability that the electronic device 101 searches for a cell supporting the first core network may be higher. Meanwhile, there is a possibility that a cell that does not support the first core network that is not yet reflected in the related information as illustrated in Table 2 may be searched. The electronic device 101 may identify that the corresponding cell does not support the first core network based on SIB 1, and may manage the related information illustrated in Table 2 by adding information about the corresponding cell.

Figure 8C:
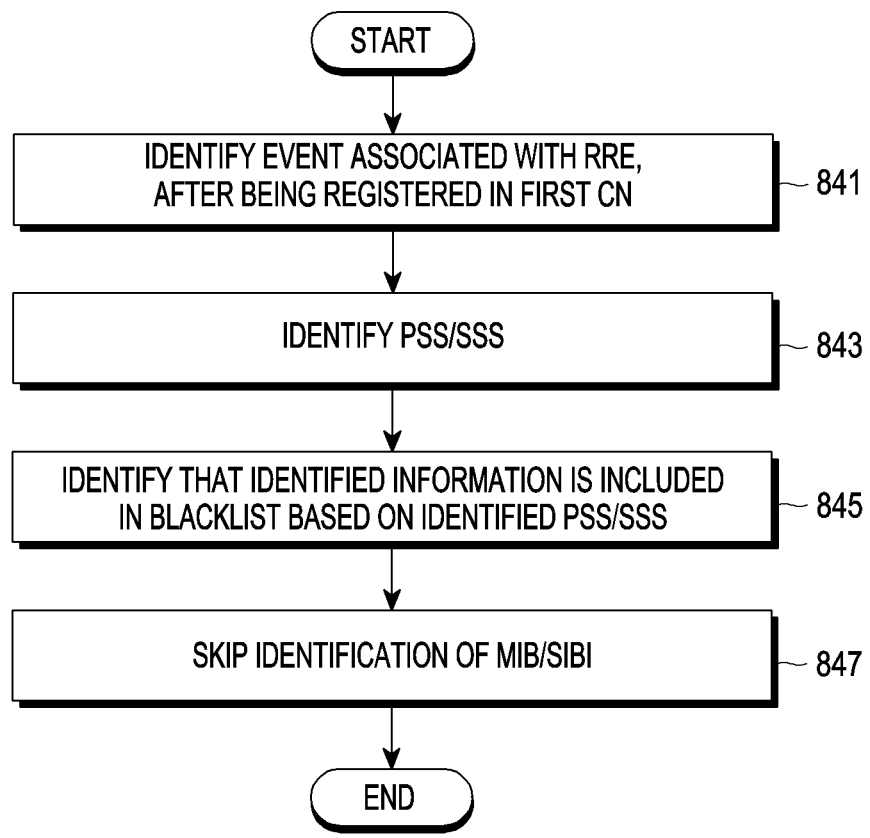
FIG. 8C is a flowchart illustrating a method of operating an electronic device according to an embodiment of the disclosure.

FIG. 8C is a flowchart illustrating a method of operating an electronic device according to an embodiment of the disclosure.

Referring to FIG. 8C, according to various embodiments of the disclosure, in operation 841, the electronic device 101 (e.g., at least one of the processor 120, the first communications processor 212, the second communications processor 214, or the unified communications processor 260) may identify an event related to the RRE after being registered with the first core network. In operation 843, the electronic device 101 may identify a primary synchronization signal (PSS)/secondary synchronization signal (SSS) by performing an RF scan. The electronic device 101 may identify the PCI based on PSS/SSS.

According to various embodiments of the disclosure, in operation 845, the electronic device 101 may identify that the checked information is included in the black list based on the checked PSS/SSS. Based on the identified information being included in the black list, the electronic device 101 may skip identifying of the MIB/SIB1 for the corresponding cell in operation 847. For example, when the electronic device 101 is registered with the EPC, the electronic device 101 may not additionally perform the MIB/SIB1 verification procedure for PCI #3, which is confirmed not to support EPC. Even if the electronic device 101 camps on the cell corresponding to PCI #3, a leaving the RRC_connection state will eventually be performed, so that the electronic device 101 may not perform decoding on the master information block (MIB) when the core network is different from the core network in which the electronic device 101 is previously registered according to PSS/SSS.

According to various embodiments of the disclosure, in operation 847, the electronic device 101 may camp on the selected cell based on the measurement result. Because decoding of MIB/SIB1 is not performed for a cell that does not support the first core network, the probability that the electronic device 101 searches for a cell supporting the first core network may be higher. Meanwhile, a cell that does not support the first core network that is not yet reflected in the related information as shown in Table 2 may be searched. The electronic device 101 may identify that the corresponding cell does not support the first core network based on SIB 1, and may manage the related information illustrated in Table 2 by adding information about the corresponding cell.

Figure 9:
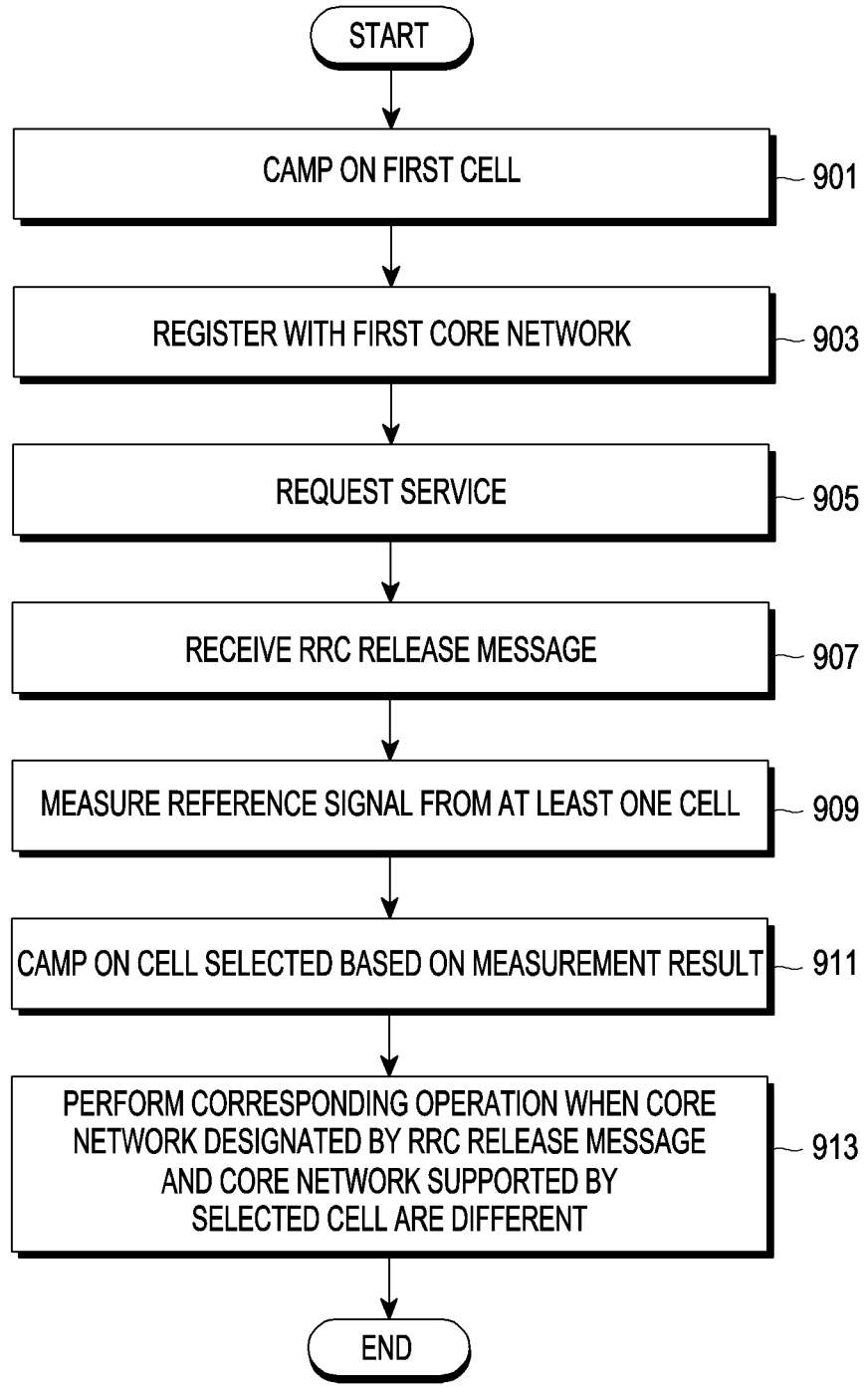
FIG. 9 is a flowchart illustrating a method of operating an electronic device and a comparative example for comparison according to an embodiment of the disclosure.

FIG. 9 is a flowchart illustrating a method of operating an electronic device and a comparative example for comparison according to an embodiment of the disclosure. Meanwhile, at least some of the operations of the electronic device 101 according to the comparative example illustrated in FIG. 9 may be performed by the electronic device 101 according to various embodiments.

Referring to FIG. 9, in operation 901, the electronic device 101 (e.g., at least one of the processor 120, the first communications processor 212, the second communications processor 214, or the unified communications processor 260) may camp on the first cell. The electronic device 101 may camp on based on E-UTRA or NR, and there is no limit to RAT. In operation 903, the electronic device 101 may register with the first core network based on the first cell. The first core network may be, for example, EPC or 5GC, but there is no limitation on the core network.

In operation 905, the electronic device 101 may perform a service request. In an example, the electronic device 101 may request an IMS voice service. For example, the electronic device 101 may perform an IMS voice service through an evolved pack system (EPS) fallback or a RAT fallback. For example, 3GPP TS 23.501, in order to obtain IMS voice service, discloses that the UE and the NG-RAN support a mechanism (e.g., RAT fallback) that allows the UE to handover or redirect the UE from the NG-RAN to the E-UTRA connected to the 5GC, or a mechanism (e.g., system fallback of E-UTRAN connected to EPC) that allows the UE to handover or redirect to EPS. The electronic device 101 may be redirected to EPS or may be redirected to E-UTRA connected to 5GC. In another example, the electronic device 101 may perform emergency services fallback. For example, in 3GPP TS 23.501, in order to obtain an emergency service, the UE and the 5GC disclose to support a mechanism (e.g., RAT fallback) for user equipment to handover or redirect towards E-UTRA connected to 5GC when NR does not support emergency service. Or in 3GPP TS 23.501, in order to obtain an emergency service, the UE and the 5GC disclose to support a mechanism (e.g., system fallback of E-UTRAN connected to EPC) for the user equipment to handover or redirect towards the EPS when the 5GC does not support emergency service. The electronic device 101 may be handed over or redirected to EPS, or may be redirected to E-UTRA connected to 5GC. For example, RAT fallback from NR/5GC to E-UTRA/5GC, system fallback from NR/5GC to E-UTRA/EPC, redirection from E-UTRA/5GC to E-UTRA/5GC, and system fallback from E-UTRA/5GC to E-UTRA/EPC may be possible.

In operation 907, the electronic device 101 may receive an RRC release message based on the service request. The RRC release message may be, for example, an RRCConnectionRelease message of 3GPP TS 36.331 or an RRCRelease message of 3GPP TS 38.331. The RRC release message may include information on a core network and/or frequency to be redirected. For example, Table 3 is an example of an RRCRelease message defined in 3GPP TS 38.331.

TABLE 3

- TS 38.331: RRCRelease (NR/5GC ⇒ E-UTRA/EPC or E-UTRA/5GC)
RedirectedCarrierInfo ::= CHOICE {
  nr CarrierInfoNR,
  eutra RedirectedCarrierInfo-EUTRA,
  ...
}
RedirectedCarrierInfo-EUTRA ::= SEQUENCE {
  eutraFrequency ARFCN-ValueEUTRA,
  cnType ENUMERATED {epc,fiveGC} OPTIONAL -- Need N
}

As illustrated in Table 3, the RRCRelease message may include a frequency to be redirected (e.g., eutraFrequency ARFCN-ValueEUTRA) and a core network to be redirected (e.g., cnType ENUMERATED {epc,fiveGC}).

For example, Table 4 is an example of an RRCConnectionRelease message defined in 3GPP TS 36.331.

TABLE 4

- TS 36.331: RRCConnectionRelease (E-UTRA/5GC ⇒ E-UTRA/EPC)
RedirectedCarrierInfo ::= CHOICE {
  eutra ARFCN-ValueEUTRA,
  geran CarrierFreqsGERAN,
  utra-FDD ARFCN-ValueUTRA,
  utra-TDD ARFCN-ValueUTRA,
  cdma2000-HRPD CarrierFreqCDMA2000,
  cdma2000-1xRTT CarrierFreqCDMA2000,
  ...,
  utra-TDD-r10 CarrierFreqListUTRA-TDD-r10,
  nr-r15 CarrierInfoNR-r15
}
RedirectedCarrierInfo-v9e0 ::= SEQUENCE {
  eutra-v9e0 ARFCN-ValueEUTRA-v9e0
}
RRCConnectionRelease-v1530-IEs ::= SEQUENCE {
  drb-ContinueROHC-r15 ENUMERATED {true}
  OPTIONAL, -- Cond UP-EDT
  nextHopChainingCount-r15 NextHopChainingCount
  OPTIONAL, -- Cond UP-EDT
  measIdleConfig-r15 MeasIdleConfigDedicated-r15
  OPTIONAL, -- Need ON
  rrc-InactiveConfig-r15 RRC-InactiveConfig-r15
  OPTIONAL, -- Need OR
  cn-Type-r15 ENUMERATED {epc,fivegc}
  OPTIONAL, -- Need OR
  nonCriticalExtension RRCConnectionRelease-v1540-IEs
  OPTIONAL
}

As illustrated in Table 4, the RRCConnectionRelease message includes a frequency to be redirected (e.g., eutra ARFCN-ValueEUTRA, and/or eutra-v9e0 ARFCN-ValueEUTRA-v9e0) and a core network to be redirected (e.g., cn-Type-r15 ENUMERATED {epc,fivegc}) may be included. For example, in 3GPP TS 36.331 or 3GPP TS 38.331, the electronic device 101 receives the RRC release message, performs cell selection, and discloses to indicate an available CN type(s) and a received CN type to an upper layer.

In operation 909, the electronic device 101 may measure a reference signal (or a synchronization signal) from at least one cell. In operation 911, the electronic device 101 may camp on the selected cell based on the measurement result. If the electronic device 101 selects a cell using only the measurement result without checking the core network supported by the cell, a case may occur that the core network to be redirected is different from the core network supported by the selected cell. In operation 913, the electronic device 101 may perform an operation corresponding to a case in which the core network designated by the RRC release message is different from the core network supported by the selected cell.

In an example, the electronic device 101 may receive an RRC release message for RAT fallback from NR/5GC to E-UTRA/5GC for an IMS voice call. The RRC release message may include redirection information to E-UTRA/5GC. In this case, the electronic device 101 may select a cell connected only to the EPC while receiving the RRC release message and performing cell selection. In this case, the electronic device 101 may perform the IMS voice call only after unnecessarily performing the TAU procedure. In another example, the electronic device 101 may receive an RRC release message for system fallback from NR/5GC to E-UTRA/EPC for an IMS voice call. The RRC release message may include redirection information to E-UTRA/EPC. In this case, the electronic device 101 may select a cell connected only to 5GC in the process of receiving the RRC release message and performing cell selection. In this case, because the 5GC does not support the IMS voice call, the electronic device 101 must inevitably select a cell supporting the EPC again, which causes a delay in providing the IMS voice call. As described above, when redirection is performed without considering the core network supported by the cell, the electronic device 101 may operate differently from the intention of the network (e.g., perform an unnecessary TAU or Attach procedure), or a delay may occur in service provision. Accordingly, selection of a cell conforming to the redirection information specified by the network is required. Hereinafter, selection of a cell conforming to the redirection information of the electronic device 101 according to various embodiments will be described.

Figure 10:
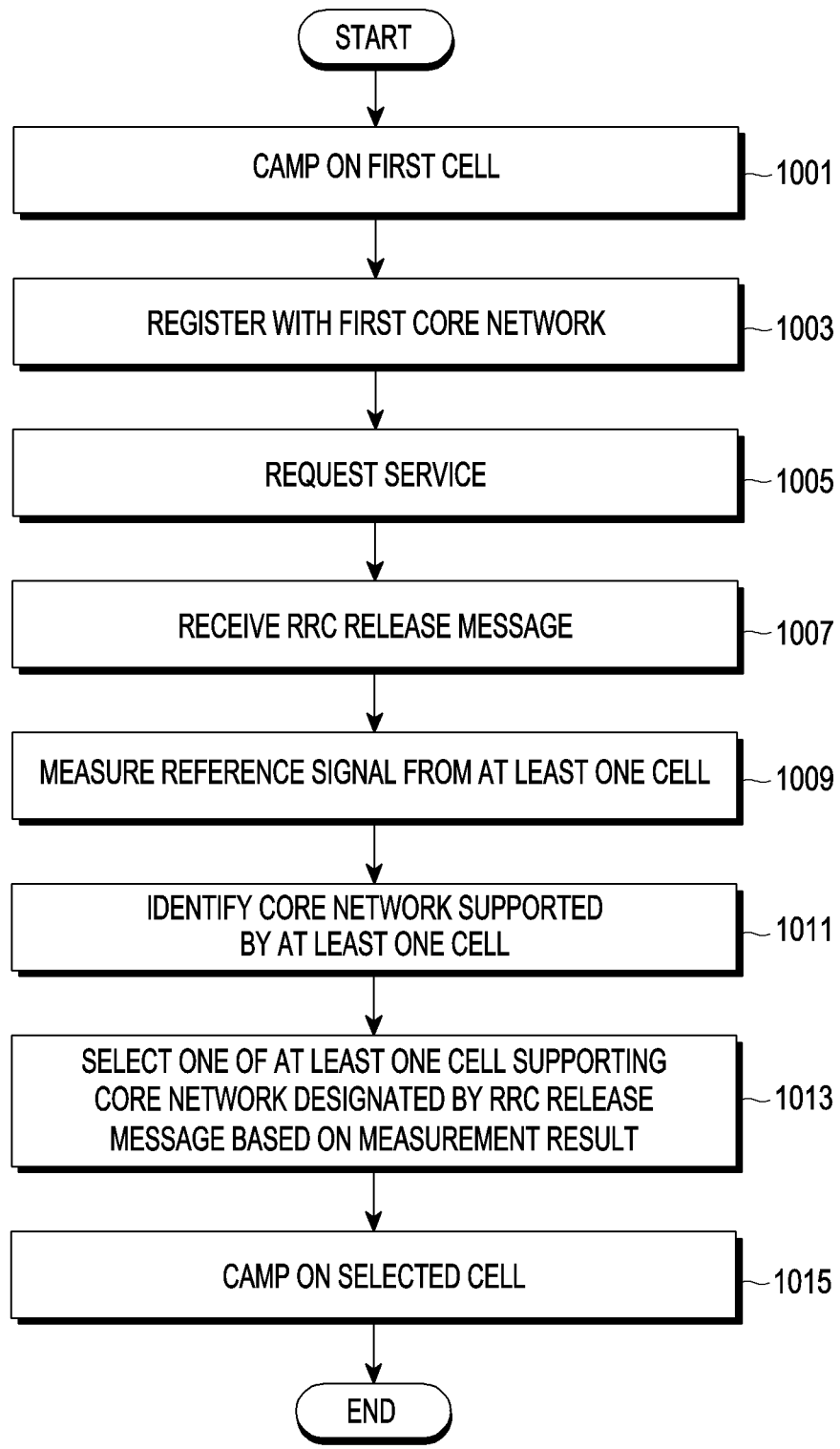
FIG. 10 is a flowchart illustrating a method of operating an electronic device according to an embodiment of the disclosure.

FIG. 10 is a flowchart illustrating a method of operating an electronic device according to an embodiment of the disclosure.

Referring to FIG. 10, according to various embodiments of the disclosure, in operation 1001, the electronic device 101 (e.g., at least one of the processor 120, the first communications processor 212, the second communications processor 214, or the unified communications processor 260) may camp on the first cell. The electronic device 101 may camp on based on E-UTRA or NR, and there is no limit to RAT. In operation 1003, the electronic device 101 may register with the first core network based on the first cell. The first core network may be, for example, EPC or 5GC, but there is no limitation on the core network. In operation 1005, the electronic device 101 may perform a service request. For example, the electronic device 101 may request an IMS voice service or an emergency service.

According to various embodiments of the disclosure, the electronic device 101 may receive an RRC release message corresponding to a service request in operation 1007. The RRC release message may include redirection information. Alternatively, in another example, even when the electronic device 101 does not request a service, the network may transmit an RRC release message including redirection information to the electronic device 101 for load balancing, and operations upon reception of the RRC release message according to various embodiments may be applied to this case as well.

According to various embodiments of the disclosure, in operation 1009, the electronic device 101 may measure a reference signal (or a synchronization signal) from at least one cell. In operation 1011, the electronic device 101 may identify a core network supported by at least one cell. For example, the electronic device 101 may identify whether the corresponding cell supports EPC and/or 5GC based on whether "PLMN-IdentityInfo" and/or "PLMN-IdentityInfo-r15" are included in SIB 1. In operation 1013, the electronic device 101 may select one of at least one cell supporting the core network designated by the RRC release message, based on the measurement result. For example, when the RRC release message specifies EPC, the electronic device 101 may select any one of at least one cell supporting EPC. For example, when the RRC release message specifies 5GC, the electronic device 101 may select any one of at least one cell supporting 5GC. For example, the electronic device 101 may select a cell having a maximum measurement size of a reference signal (or a synchronization signal) from among at least one cell supporting the core network designated in the RRC release message. Alternatively, even if the measurement size is not the maximum, the electronic device 101 may select one of the cells in which the measurement result satisfies the cell selection criterion. Alternatively, when there is no cell that satisfies the cell selection criterion, the electronic device 101 may select any cell, and there is no limitation on a cell selection method. In operation 1015, the electronic device 101 may camp on the selected cell. Accordingly, unnecessary operation or service delay due to the difference between the core network designated in the RRC release message and the core network supported by the selected cell may be prevented.

Figure 11:
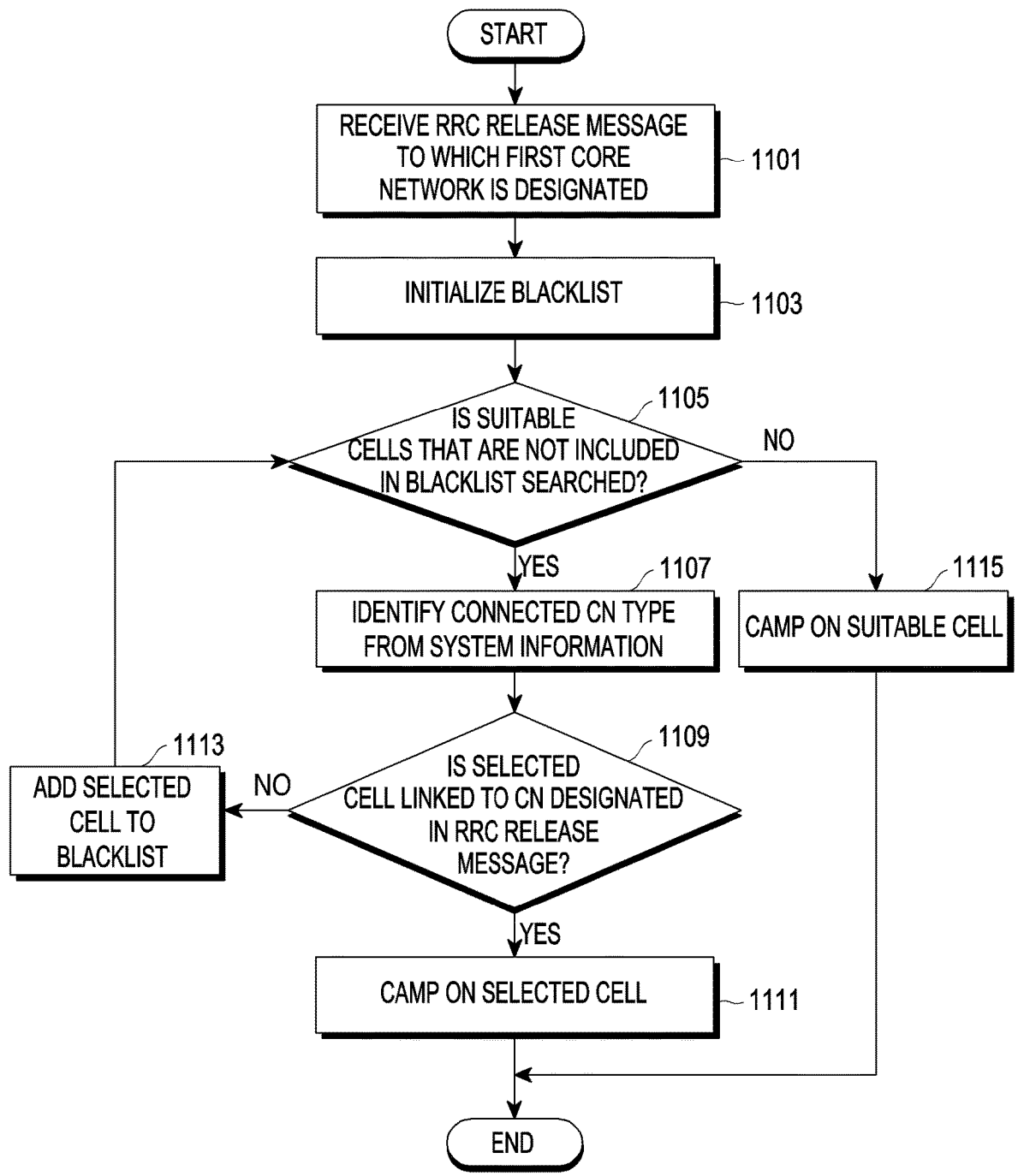
FIG. 11 is a flowchart illustrating a method of operating an electronic device according to an embodiment of the disclosure.

FIG. 11 is a flowchart illustrating a method of operating an electronic device according to an embodiment of the disclosure.

Referring to FIG. 11, according to various embodiments of the disclosure, in operation 1101, the electronic device 101 (e.g., at least one of the processor 120, the first communications processor 212, the second communications processor 214, or the unified communications processor 260) may receive an RRC release message to which the first core network is designated. For example, the electronic device 101 may request a service and may receive an RRC release message in response thereto. Alternatively, even when the electronic device 101 does not request a service, the network may transmit an RRC release message for redirection to the electronic device 101. The RRC release message may include information for identifying the first core network. In the embodiment of FIG. 11, it is assumed that the electronic device 101 receives an RRC release message designating the first core network. In operation 1103, the electronic device 101 may initialize the black list. The black list may include, for example, information about a cell that does not support the first core network. For example, the information about the cell may include at least one of a physical cell identity (PCI) and a frequency (e.g., ARFCN). Alternatively, for example, the electronic device 101 may replace the black list and store cell information and supporting core network information as illustrated in Table 2 in association. Depending on the implementation, the operation of initializing the black list may be omitted.

According to various embodiments of the disclosure, in operation 1105, the electronic device 101 may check whether a suitable cell not included in the black list is found. When an appropriate cell not included in the black list is found (e.g., 1105—Yes), in operation 1107, the electronic device 101 may identify the type of the connected core network from system information of the corresponding cell. For example, Table 5 is an example of a black list according to various embodiments.

TABLE 5

| PCI | ARFCN |
|---|---|
| PCI #3 | ARFCN #3 |

In Table 5, both PCI and AFRCN are illustrated as reflected and there is no limitation as long as information capable of identifying a cell is provided. For example, Table 5 may be an example of a black list indicating entities subject to exclusion that do not support EPC. For example, a cell corresponding to PCI #3 and/or ARFCN #3 may be previously identified as supporting only 5GC, and when the electronic device 101 intends to select a cell supporting EPC, the electronic device 101 may identify the corresponding cell as a black list.

For example, the electronic device 101 may identify whether the corresponding cell supports EPC and/or 5GC based on whether SIB 1 includes "PLMN-IdentityInfo" and/or "PLMN-IdentityInfo-r15". In another embodiment of the disclosure, if information capable of identifying a cell as illustrated in Table 2, rather than a black list, such as Table 5 indicating an exclusion target, and related information between the corresponding core network and the supporting core network are managed, the electronic device 101 may identify whether the found appropriate cell supports the core network designated in the RRC release message.

According to various embodiments of the disclosure, in operation 1109, the electronic device 101 may identify whether the selected cell is connected to the core network designated in the RRC release message. The electronic device 101 may identify whether the core network designated in the RRC release message and the core network supported by the selected cell are the same or different based on the possible core network types identified based on the 1107 operation. When the cell selected in the RRC release message is connected to the core network designated in the RRC release message (1109—Yes), the electronic device 101 may camp on the selected cell in operation 1111. If the cell selected in the RRC release message is not connected to the core network designated in the RRC release message (1109—No), the electronic device 101 may add the cell selected in operation 1113 to the black list. If an appropriate cell included in the black list is not found (1105—No), the electronic device 101 may camp on an appropriate cell included in the black list, for example, in operation 1115.

In various embodiments of the disclosure, the electronic device 101 may perform a search for a cell associated with a core network designated in the RRC release message among previously stored information. For example, the electronic device 101 may support a plurality of frequencies, and may be configured to search for a cell by performing an RF scan on the plurality of frequencies. Meanwhile, the electronic device 101, for example, may store information on a supported network for each frequency (ARFCN) as illustrated in Table 2. Accordingly, the electronic device 101 may not perform the RF scan for a frequency that does not support the core network designated in the RRC release message. For example, when the core network designated in the RRC release message is EPC, the electronic device 101 may be set not to perform an RF scan for ARFCN #3, which is confirmed not to support EPC. Accordingly, the electronic device 101 may not perform an RF scan that does not support a specific core network. According to various embodiments of the disclosure, the electronic device 101 may camp on a cell selected based on a cell search result. Because the RF scan for a frequency that does not support the core network designated in the RRC release message is not performed, the probability that the electronic device 101 searches for a cell supporting the core network designated in the RRC release message may be higher. Meanwhile, there is a possibility that a cell that does not support the first core network that is not yet reflected in the related information as illustrated in Table 2 may be searched. The electronic device 101 may identify that the corresponding cell does not support the first core network based on SIB 1, and may manage the related information illustrated in Table 2 by adding information about the corresponding cell.

According to various embodiments of the disclosure, the electronic device 101 (e.g., at least one of the processor 120, the first communications processor 212, the second communications processor 214, or the unified communications processor 260) may identify a primary synchronization signal (PSS)/secondary synchronization signal (SSS) by performing an RF scan. The electronic device 101 may identify the PCI based on PSS/SSS. According to various embodiments of the disclosure, when the identified PSS/SSS includes pre-stored information related to the core network designated in the RRC release message, the electronic device 101 may identify MIB/SIB 1. For example, the electronic device 101 may manage the cell information illustrated in Table 2 and the association information between the corresponding core network. For example, when the core network designated in the RRC release message is EPC, the electronic device 101 may not additionally perform the MIB/SIB1 verification procedure for PCI #3, which is confirmed not to support EPC. When camping on the cell corresponding to PCI #3, there is a possibility that the operation may not be performed according to the network request, and the electronic device 101 may not perform decoding on the MIB when the core network is different from the core network designated in the RRC release message according to PSS/SSS. According to various embodiments of the disclosure, the electronic device 101 may camp on a cell selected based on a measurement result. Because decoding of MIB/SIB1 is not performed for a cell that does not support the first core network, the probability that the electronic device 101 searches for a cell supporting the core network designated in the RRC release message may be higher. Meanwhile, there is a possibility that a cell that does not support the designated core network in the RRC release message that is not yet reflected in the related information as illustrated in Table 2 is searched. The electronic device 101 may confirm that the corresponding cell does not support the first core network based on SIB 1, and may manage the related information illustrated in Table 2 by adding information about the corresponding cell.

Figure 12:
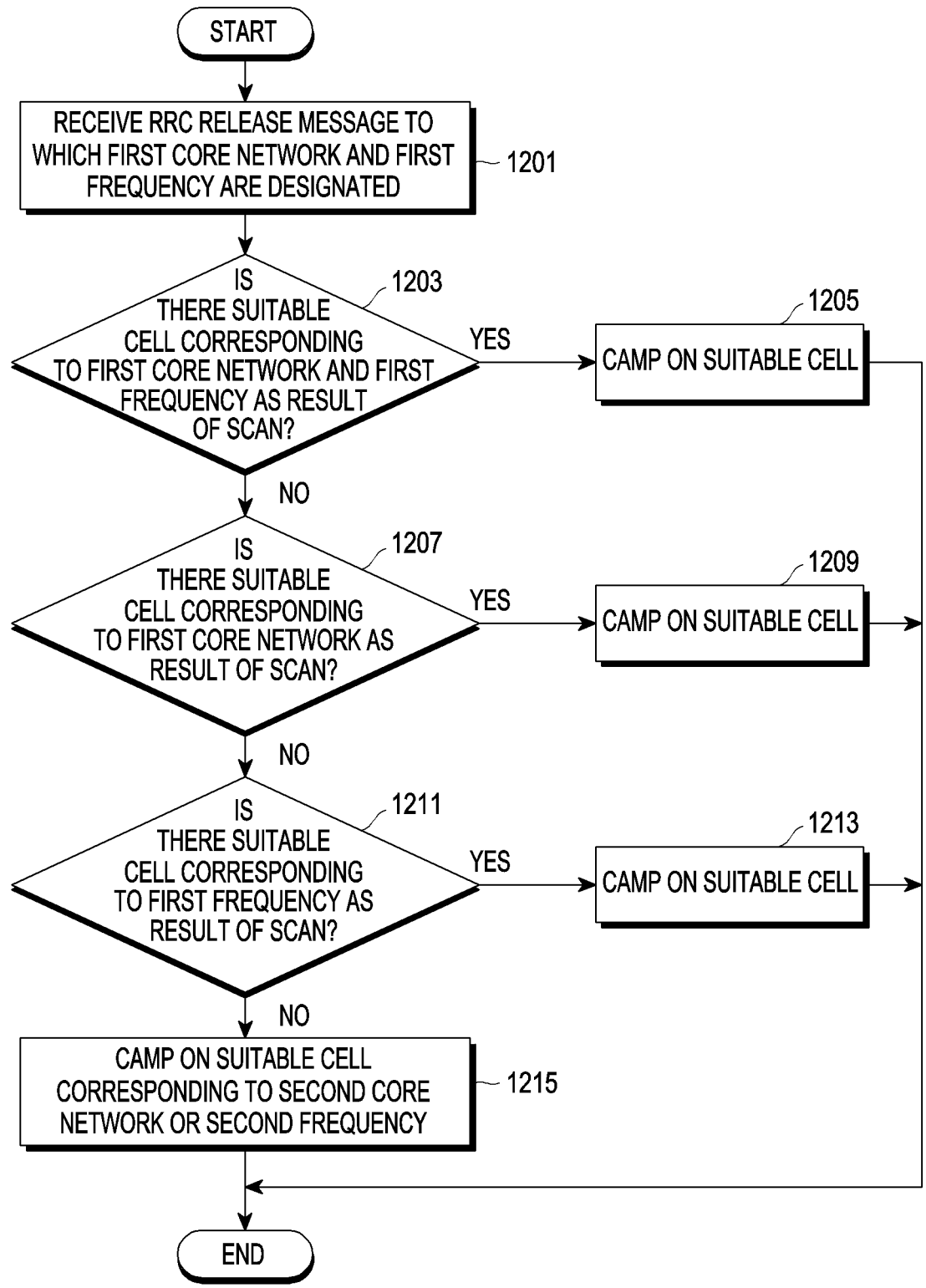
FIG. 12 is a flowchart illustrating a method of operating an electronic device according to an embodiment of the disclosure.

FIG. 12 is a flowchart illustrating a method of operating an electronic device according to an embodiment of the disclosure.

Referring to FIG. 12, according to various embodiments of the disclosure, in operation 1201, the electronic device 101 (e.g., at least one of the processor 120, the first communications processor 212, the second communications processor 214, or the unified communications processor 260) may receive an RRC release message to which the first core network and the first frequency are designated. For example, the electronic device 101 may request a service and may receive an RRC release message in response thereto. Alternatively, even when the electronic device 101 does not request a service, the network may transmit an RRC release message for redirection to the electronic device 101.

According to various embodiments of the disclosure, in operation 1203, the electronic device 101 may identify whether an appropriate cell corresponding to the first core network and the first frequency exists as a result of the scan. As described above, the electronic device 101 may identify a core network supported by the cell based on system information (e.g., SIB 1) from the cell. Accordingly, the electronic device 101 may identify whether an appropriate cell that corresponds to the first core network designated in the RRC release message and supports up to the first frequency exists. If there is an appropriate cell that satisfies both the first core network and the first frequency specified in the RRC release message (1203—Yes), the electronic device 101 may camp on the appropriate cell in operation 1205.

According to various embodiments of the disclosure, when there is no appropriate cell satisfying both the first core network and the first frequency specified in the RRC release message (1203—No), the electronic device 101, in operation 1207, may identify whether an appropriate cell corresponding to the first core network exists as a result of the scan. For example, the electronic device 101 may identify whether an appropriate cell that supports the first core network but supports a frequency other than the first frequency exists. If an appropriate cell that supports the first core network designated in the RRC release message but supports another frequency exists (1203—Yes), the electronic device 101 may camp on the appropriate cell in operation 1209.

According to various embodiments of the disclosure, when there is no suitable cell supporting the first core network but supporting another frequency (1207—No), in operation 1211, the electronic device 101 may identify whether an appropriate cell that supports another core network different from the first core network but corresponds to the first frequency exists as a result of the scan. For example, the electronic device 101 may identify whether an appropriate cell that does not support the first core network but supports the first frequency exists. If an appropriate cell that does not support the first core network but supports the first frequency exists (1211—Yes), the electronic device 101 may camp on the appropriate cell in operation 1213. If, although not supporting the first core network, there is no suitable cell supporting the first frequency (1211—No), the electronic device 101 may camp on the second core network or an appropriate cell corresponding to the second frequency in operation 1215. If the cell search for another core network fails, the electronic device 101 may search for a cell of 3G or less. Meanwhile, in the embodiment of FIG. 12, operation 1207 is illustrated as being performed preferentially over operation 1211, but there is no limitation in the order of performing both operations.

Figure 13:
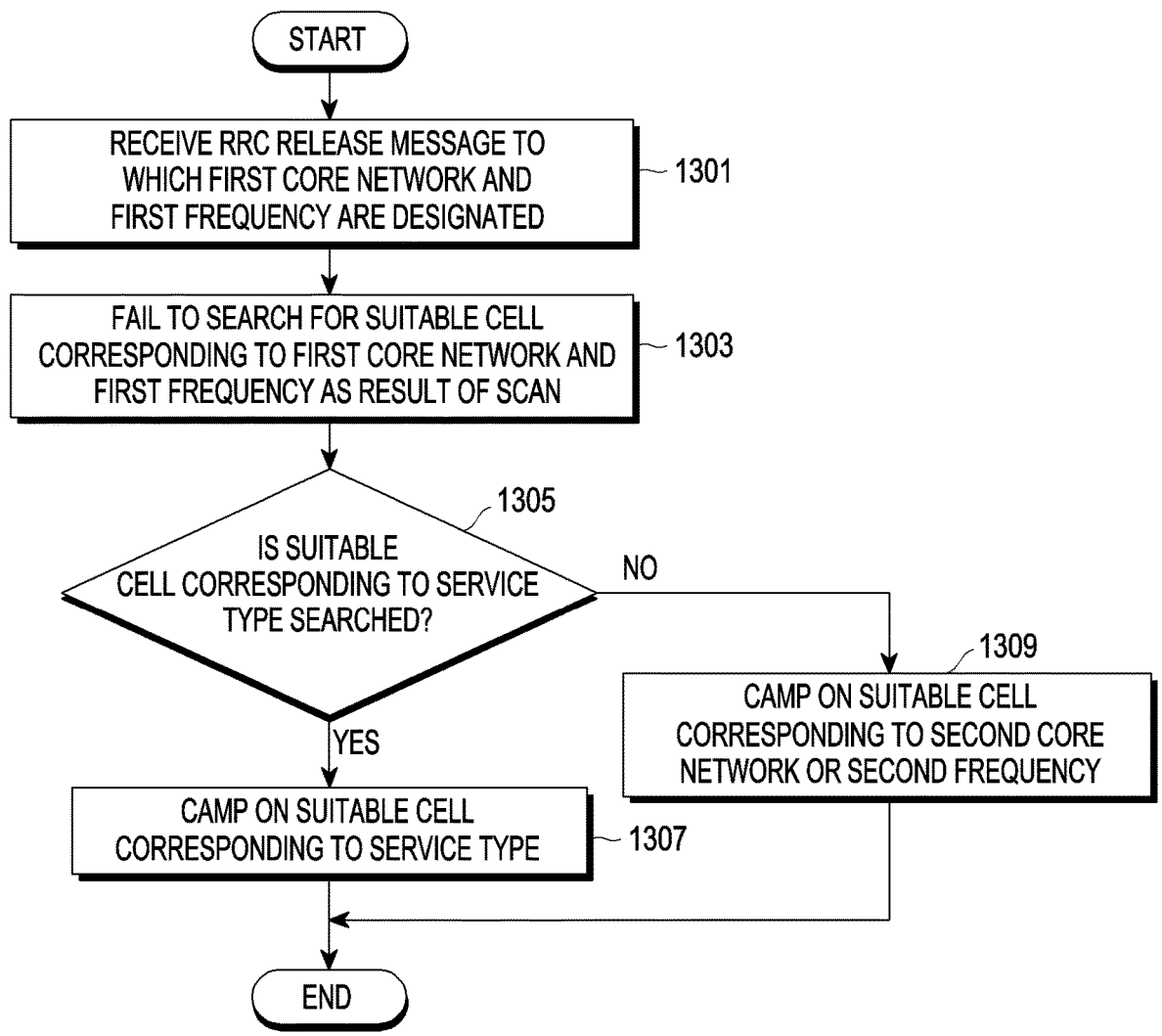
FIG. 13 is a flowchart illustrating a method of operating an electronic device according to an embodiment of the disclosure.

FIG. 13 is a flowchart illustrating a method of operating an electronic device according to an embodiment of the disclosure.

Referring to FIG. 13, according to various embodiments of the disclosure, in operation 1301, the electronic device 101 (e.g., at least one of the processor 120, the first communications processor 212, the second communications processor 214, or the unified communications processor 260) may receive an RRC release message to which the first core network and the first frequency are designated. For example, the electronic device 101 may request a service and may receive an RRC release message in response thereto. In operation 1303, the electronic device 101 may fail to search for an appropriate cell corresponding to the first core network and the first frequency as a result of the scan. As described above, the electronic device 101 may identify a supported core network based on system information (e.g., SIB 1) from at least one cell. In the example of FIG. 13, it is assumed that the electronic device 101 fails to search for an appropriate cell supporting the first core network and the first frequency.

According to various embodiments of the disclosure, in operation 1305, the electronic device 101 may identify whether an appropriate cell corresponding to the type of service is searched. If an appropriate cell corresponding to the service type is found (1305—Yes), the electronic device 101 may camp on an appropriate cell corresponding to the service type in operation 1307. If an appropriate cell corresponding to the type of service is not found (1305—No), the electronic device 101 may camp on an appropriate cell corresponding to the second core network or the second frequency in operation 1309.

In an example, the electronic device 101 may request an emergency call service and receive an RRC release message designating a first core network corresponding thereto. The electronic device 101 may fail to search for a cell supporting the first core network. The electronic device 101 may identify whether an appropriate cell corresponding to the requested service type, for example, an emergency call, exists based on the system information of the cell. For example, the electronic device 101 may camp on by selecting a cell in which "ims-EmergencySupport5GC-r15" of SIB 1 is set to true. Alternatively, when the electronic device 101 requests eCall but fails to search for a cell supporting the core network designated in the RRC release message, a cell in which "eCallOverIMS-Support5GC-r15" of SIB 1 is set to true may be selected and camped on. If the search for a cell corresponding to the corresponding service also fails, the electronic device 101 may search for a 3G cell.

According to various embodiments of the disclosure, the electronic device 101 may further manage whether at least one of ims-EmergencySupport-r9, eCallOverIMS-Support-r14, ims-EmergencySupport5GC-r15, or eCallOverIMS-Support5GC-r15 is supported in addition to the related information illustrated in Table 2. If a cell supporting a core network different from the core network designated in the RRC release message is identified as a cell corresponding to a specific service through the association information, the electronic device 101 may identify whether the corresponding cell is an appropriate cell.

According to various embodiments of the disclosure, an electronic device may include at least one processor, and the at least one processor may be configured to camp on a first cell, perform a procedure for registration with a first core network after camping on the first cell, identify occurrence of an event requiring cell selection in a state registered with the first core network, identify a core network corresponding to the occurred event, identify a core network supported by each of at least one second cell, identify a measurement result of the reference signal respectively associated with at least one third cell supporting the core network corresponding to the occurred event among the at least one second cell, and camp on the identified fourth cell among the at least one third cell, based on the measurement result.

According to various embodiments of the disclosure, the at least one processor may be, as at least part of the identifying the core network supported by each of the at least one second cell, configured to identify at least one SIB 1 corresponding to each of the at least one second cell, and identify whether each of the at least one second cell supports EPC and/or 5GC based on whether each of the at least one SIB 1 includes PLMN-IdentityInfo and/or PLMN-IdentityInfo-r15.

According to various embodiments of the disclosure, the at least one processor is further configured to identify an association information between at least one cell and a core network, and wherein the at least one processor may be, as at least part of the identifying a measurement result of a reference signal respectively associated with the at least one third cell, configured to measure the reference signal respectively associated with the at least one third cell supporting the core network corresponding to the occurred event based on the association information.

According to various embodiments of the disclosure, the at least one processor may be, as at least part of the refraining from measuring at least one cell that does not support a core network corresponding to the occurred event, further configured to refrain from measuring the at least one cell that does not support the core network corresponding to the occurred event based on the association information.

According to various embodiments of the disclosure, the at least one processor may be, as at least part of the refraining from measuring at least one cell that does not support a core network corresponding to the occurred event, configured to refrain from an RF scan for at least one frequency not associated with the core network corresponding to the occurred event identified based on the association information, and/or refrain from decoding MIB and/or SIB for at least one PCI not associated with a core network corresponding to the occurred event identified based on the association information.

According to various embodiments of the disclosure, the at least one processor may be, as at least part of identifying the occurrence of the event, configured to identify at least one trigger causing the RRC connection re-establishment, and wherein the at least one processor is, as at least part of the identifying the core network corresponding to the occurred event, configured to identify the first core network in which the electronic device is registered as the core network corresponding to the occurred event before the at least one trigger is confirmed.

According to various embodiments of the disclosure, the at least one processor may be, as at least part of the operation of identifying the measurement result of the reference signal respectively associated with the at least one third cell, configured to identify the measurement result of the reference signal associated with the at least one third cell supporting the first core network, and wherein the at least one processor, as at least a part of the operation of camping on the identified fourth cell among the at least one third cell based on the measurement result, is configured to select the fourth cell corresponding to the highest reception strength among the measurement results.

According to various embodiments of the disclosure, the at least one processor may be further configured to perform a RRC connection re-establishment procedure for the fourth cell.

According to various embodiments of the disclosure, the at least one processor may be further configured to, based on identification of at least one trigger causing the RRC connection re-establishment, start a T311 timer, and, based on a failure to search for the at least one third cell supporting the first core network, perform a leaving the RRC_connection state until the T311 timer expires.

According to various embodiments of the disclosure, the at least one processor may be configured to identify receipt of a RRC release message as at least part of the identifying the occurrence of the event, and wherein the at least one processor may be, as at least part of the identifying a core network corresponding to the occurred event, configured to identify a core network designated in the RRC release message as the core network corresponding to the occurred event.

According to various embodiments of the disclosure of the disclosure, the at least one processor may be, as at least part of the identifying the measurement result of the reference signal respectively associated with the at least one third cell, configured to identify the measurement result of the reference signal associated with the at least one third cell supporting the core network designated in the RRC release message, and wherein the at least one processor may be, as at least a part of the camping on the identified fourth cell among the at least one third cell based on the measurement result, configured to select the fourth cell corresponding to the highest reception strength among the measurement results.

According to various embodiments of the disclosure, the at least one processor may be, as at least part of the identifying the measurement result of the reference signal respectively associated with the at least one third cell, configured to identify the measurement result of the reference signal associated with the at least one third cell supporting the core network designated in the RRC release message, and wherein the at least one processor may be, as at least a part of the camping on the identified fourth cell among the at least one third cell based on the measurement result, configured to identify the fourth cell based on a measurement result of at least one cell supporting the first frequency specified in the RRC release message among the at least one third cell.

According to various embodiments of the disclosure, the at least one processor may be, as at least part of the identifying the measurement result of the reference signal respectively associated with the at least one third cell, configured to identify the measurement result of the reference signal associated with the at least one third cell supporting the core network designated in the RRC release message, and wherein the at least one processor may be, as at least part of the camping on to the fourth cell identified among the at least one third cell based on the measurement result, configured to, based on that at least one cell supporting the first frequency among the at least one third cells is not present identify the fourth cell based on a measurement result of at least one cell supporting a frequency other than the first frequency among the at least one third cell.

According to various embodiments of the disclosure, the at least one processor may be further configured to, based on a failure of identification of the at least one third cell supporting the core network designated in the RRC release message, identify a fifth cell based on the measurement result of at least one cell supporting the first frequency and camp on the fifth cell.

According to various embodiments of the disclosure, the at least one processor may be further configured to, based on a failure of identification of the at least one third cell supporting the core network designated in the RRC release message, camp on by selecting one of the at least one cell corresponding to a service type associated with the RRC release message.

According to various embodiments of the disclosure, a method of operating an electronic device may include camping on a first cell, performing a procedure for registration in a first core network after camping on the first cell, identifying occurrence of an event requiring cell selection in a state registered with the first core network, identifying a core network corresponding to the occurred event, identifying a core network supported by each of at least one second cell, identifying a measurement result of a reference signal respectively associated with at least one third cell supporting a core network corresponding to the occurred event among the at least one second cell, and camping on the identified fourth cell among the at least one third cell based on the measurement result.

According to various embodiments of the disclosure, identifying the core network supported by each of the at least one second cell may include identifying at least one SIB 1 corresponding to each of the at least one second cell, and identifying whether each of the at least one second cell supports EPC and/or 5GC, based on whether each of the at least one SIB 1 includes PLMN-IdentityInfo and/or PLMN-IdentityInfo-r15.

According to various embodiments of the disclosure, a method of operating the electronic device further includes identifying an association information between the at least one cell and a core network, and an operation of identifying the measurement result of the reference signal respectively associated with the at least one third cell may measure the reference signal respectively associated with the at least one third cell supporting the core network corresponding to the occurred event based on the association information.

According to various embodiments of the disclosure, identifying the occurrence of the event, includes identifying at least one trigger causing a RRC connection re-establishment, and wherein identifying the core network corresponding to the occurred event may include identifying the first core network in which the electronic device is registered as a core network corresponding to the occurred event before the at least one trigger is identified.

According to various embodiments of the disclosure, identifying the occurrence of the event includes identifying receipt of a RRC release message, and wherein identifying a core network corresponding to the occurred event may include identifying a core network designated in the RRC release message as a core network corresponding to the occurred event.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
at least one processor,
wherein the at least one processor is configured to:
   camp on a first cell,
   perform a procedure for registration with a first core network after camping on the first cell,
   identify occurrence of an event requiring cell selection in a state registered with the first core network,
   identify a core network corresponding to the occurred event,
   identify a core network supported by each of at least one second cell,
   identify a measurement result of a reference signal respectively associated with at least one third cell supporting the core network corresponding to the occurred event among the at least one second cell,
   identify a fourth cell, and
   camp on the identified fourth cell among the at least one third cell, based on the measurement result.

2. The electronic device of claim 1, wherein the at least one processor is, as at least part of the identifying of the core network supported by each of the at least one second cell, is further configured to:
   identify at least one system information block (SIB) 1 corresponding to each of the at least one second cell, and
   identify whether each of the at least one second cell supports evolved packed core (EPC) and/or 5th generation core (5GC) based on whether each of the at least one SIB 1 includes public land mobile network (PLMN)-IdentityInfo and/or PLMN-Identity Info-r15.

3. The electronic device of claim 1,
wherein the at least one processor is further configured to identify an association information between at least one cell and a core network, and
wherein the at least one processor is, as at least part of the identifying the measurement result of the reference signal respectively associated with the at least one third cell, further configured to measure the reference signal respectively associated with the at least one third cell supporting the core network corresponding to the occurred event, based on the association information.

4. The electronic device of claim 3, wherein the at least one processor is further configured to refrain from measuring the at least one cell that does not support the core network corresponding to the occurred event, based on the association information.

5. The electronic device of claim 4, wherein the at least one processor is, as at least part of the refraining from measuring the at least one cell that does not support the core network corresponding to the occurred event, further configured to:
   refrain from an RF scan for at least one frequency not associated with the core network corresponding to the occurred event identified based on the association information, and/or
   refrain from decoding master information block (MIB) and/or system information block (SIB) for at least one physical cell identity (PCI) not associated with a core network corresponding to the occurred event identified based on the association information.

6. The electronic device of claim 1,
wherein the at least one processor is, as at least part of the identifying the occurrence of the event, further configured to identify at least one trigger causing a radio resource control (RRC) connection re-establishment, and
wherein the at least one processor is, as at least part of the identifying the core network corresponding to the occurred event, further configured to identify the first core network in which the electronic device is registered as the core network corresponding to the occurred event before the at least one trigger is confirmed.

7. The electronic device of claim 6,
wherein the at least one processor is, as at least part of the identifying the measurement result of the reference signal respectively associated with the at least one third cell, further configured to identify the measurement result of the reference signal associated with the at least one third cell supporting the first core network, and
wherein the at least one processor, as at least part of the camping on the identified fourth cell among the at least one third cell, based on the measurement result, is further configured to select the fourth cell corresponding to the highest reception strength among the measurement results.

8. The electronic device of claim 6, wherein the at least one processor is further configured to perform a RRC connection re-establishment procedure for the fourth cell.

9. The electronic device of claim 6, wherein the at least one processor is further configured to:
   based on identification of at least one trigger causing the RRC connection re-establishment, start a T311 timer; and
   based on a failure to search for the at least one third cell supporting the first core network, perform an operation of leaving an RRC_connection state until the T311 timer expires.

10. The electronic device of claim 1,
wherein the at least one processor is further configured to identify receipt of a RRC release message as at least part of the identifying the occurrence of the event, and
wherein the at least one processor is, as at least part of the identifying the core network corresponding to the occurred event, further configured to identify a core network designated in the RRC release message as the core network corresponding to the occurred event.

11. The electronic device of claim 10,
wherein the at least one processor is, as at least part of the identifying the measurement result of the reference signal respectively associated with the at least one third cell, further configured to identify the measurement result of the reference signal associated with the at least one third cell supporting the core network designated in the RRC release message, and
wherein the at least one processor is, as at least part of the camping on the identified fourth cell among the at least one third cell, based on the measurement result, further configured to select the fourth cell corresponding to the highest reception strength among the measurement results.

12. The electronic device of claim 10,
wherein the at least one processor is, as at least part of the identifying the measurement result of the reference signal respectively associated with the at least one third cell, further configured to identify the measurement result of the reference signal associated with the at least one third cell supporting the core network designated in the RRC release message, and
wherein the at least one processor is, as at least part of the camping on the identified fourth cell among the at least one third cell, based on the measurement result, further configured to identify the fourth cell, based on a measurement result of at least one cell supporting a first frequency specified in the RRC release message among the at least one third cell.

13. The electronic device of claim 10,
wherein the at least one processor is, as at least part of the identifying the measurement result of the reference signal respectively associated with the at least one third cell, further configured to identify a measurement result of a reference signal associated with the at least one third cell supporting the core network designated in the RRC release message, and
wherein the at least one processor is, as at least part of the camping on to the fourth cell identified among the at least one third cell, based on the measurement result, further configured to, based on that at least one cell supporting a first frequency among the at least one third cell is not present, identify the fourth cell, based on a measurement result of at least one cell supporting a frequency other than the first frequency among the at least one third cell.

14. The electronic device of claim 12, wherein the at least one processor is further configured to:
based on a failure of identification of the at least one third cell supporting the core network designated in the RRC release message, identify a fifth cell based on the measurement result of at least one cell supporting the first frequency, and
camp on the fifth cell.

15. The electronic device of claim 10, wherein the at least one processor is further configured to, based on a failure of identification of the at least one third cell supporting the core network designated in the RRC release message, camp on by selecting one of at least one cell corresponding to a service type associated with the RRC release message.

16. A method of operating an electronic device, the method comprising:
camping on a first cell;
performing a procedure for registration in a first core network after camping on the first cell;
identifying occurrence of an event requiring cell selection in a state registered with the first core network;
identifying a core network corresponding to the occurred event;
identifying a core network supported by each of at least one second cell;
identifying a measurement result of a reference signal respectively associated with at least one third cell supporting a core network corresponding to the occurred event among the at least one second cell;
identifying a fourth cell; and
camping on the identified fourth cell among the at least one third cell, based on the measurement result.

17. The method of claim 16, wherein the identifying of the core network supported by each of the at least one second cell comprises:
identifying at least one SIB 1 corresponding to each of the at least one second cell; and
identifying whether each of the at least one second cell supports EPC and/or 5GC, based on whether each of the at least one SIB 1 includes public land mobile network (PLMN)-Identity Info and/or PLMN-Identity Info-r15.

18. The method of claim 16, further comprising:
identifying an association information between at least one cell and a core network,
wherein the identifying of the measurement result of the reference signal respectively associated with the at least one third cell comprises measuring the reference signal respectively associated with the at least one third cell supporting the core network corresponding to the occurred event, based on the association information.

19. The method of claim 16,
wherein the identifying of the occurrence of the event comprises identifying at least one trigger causing a RRC connection re-establishment, and
wherein the identifying of the core network corresponding to the occurred event comprises identifying the first core network in which the electronic device is registered as the core network corresponding to the occurred event before the at least one trigger is identified.

20. The method of claim 16,
wherein the identifying of the occurrence of the event comprises identifying receipt of a RRC release message, and
wherein the identifying of the core network corresponding to the occurred event comprises identifying the core network designated in the RRC release message as the core network corresponding to the occurred event.

* * * * *